(12) United States Patent
Limberg

(10) Patent No.: US 8,406,338 B2
(45) Date of Patent: Mar. 26, 2013

(54) TERMINATED CONCATENATED CONVOLUTIONAL CODING OF M/H GROUP DATA IN 8VSB DIGITAL TELEVISION SIGNALS

(76) Inventor: Allen LeRoy Limberg, Port Charlotte, FL (US)

( * ) Notice: Subject to any disclaimer, the term of this patent is extended or adjusted under 35 U.S.C. 154(b) by 367 days.

(21) Appl. No.: 12/924,074

(22) Filed: Sep. 20, 2010

(65) Prior Publication Data

US 2011/0037903 A1 Feb. 17, 2011

Related U.S. Application Data

(63) Continuation-in-part of application No. 12/660,757, filed on Mar. 4, 2010, now abandoned.

(60) Provisional application No. 61/209,141, filed on Mar. 4, 2009, provisional application No. 61/215,764, filed on May 9, 2009, provisional application No. 61/280,626, filed on Nov. 6, 2009, provisional application No. 61/335,246, filed on Jan. 4, 2010.

(51) Int. Cl.
*H04L 27/00* (2006.01)

(52) U.S. Cl. ......... 375/295; 375/316; 375/219; 714/758

(58) Field of Classification Search ................... 375/295, 375/316, 219; 714/758
See application file for complete search history.

(56) References Cited

U.S. PATENT DOCUMENTS

2009/0060051 A1* 3/2009 Song et al. ............... 375/240.25

* cited by examiner

*Primary Examiner* — Zewdu Kassa

(57) ABSTRACT

M/H Groups each begin with a respective trellis-initialization of 2/3 trellis coding used as inner convolutional coding of concatenated convolutional coding (CCC). Concluding each M/H Group with another trellis-initialization of 2/3 trellis coding terminates the inner convolutional coding of the CCC properly, facilitating bi-directional decoding thereof. Properly terminating the inner convolutional coding of the CCC also facilitates wrap-around turbo decoding of that M/H Group beginning after the earlier training sequence with known 8VSB symbols and concluding with the trellis-initialization of 2/3 trellis coding before that earlier training sequence. At least one further trellis-initialization of 2/3 trellis coding can be inserted into an M/H Group for splitting it into first and second portions that can be decoded separately and that can be efficiently packed by portions of RS Frames employing transverse Reed-Solomon codes of a standard length.

12 Claims, 25 Drawing Sheets

| AAAA | AAAA | AAAA | AAAA | AAAA | AAAA | FFFF | FFFF | FFFF | FFFF | FFFF | FFFF |
|------|------|------|------|------|------|------|------|------|------|------|------|
| BBBB | BBBB | BBBB | BBBB | BBBB | BBBB | GGGG | GGGG | GGGG | GGGG | GGGG | GGGG |
| CCCC | CCCC | CCCC | 0000 | 0000 | 0000 | 0000 | 0000 | 0000 | HHHH | HHHH | HHHH |

BEFORE M/H GROUP — BEGINNING OF M/H GROUP

Fig. 7 Controlled Transition into M/H Group

| FFFF | FFFF | FFFF | FFFF | FFFF | FFFF | AAAA | AAAA | AAAA | AAAA | AAAA | AAAA |
|------|------|------|------|------|------|------|------|------|------|------|------|
| GGGG | GGGG | GGGG | GGGG | GGGG | GGGG | BBBB | BBBB | BBBB | BBBB | BBBB | BBBB |
| HHHH | HHHH | HHHH | 0000 | 0000 | 0000 | 0000 | 0000 | 0000 | CCCC | CCCC | CCCC |

CONCLUSION OF M/H GROUP — AFTER M/H GROUP

Fig. 8 Controlled Transition from M/H Group

| FFFF | FFFF | FFFF | FFFF | FFFF | FFFF | FFFF | FFFF | FFFF | FFFF | FFFF | FFFF |
|------|------|------|------|------|------|------|------|------|------|------|------|
| GGGG | GGGG | GGGG | GGGG | GGGG | GGGG | GGGG | GGGG | GGGG | GGGG | GGGG | GGGG |
| HHHH | HHHH | HHHH | 0000 | 0000 | 0000 | 0000 | 0000 | 0000 | HHHH | HHHH | HHHH |

CONCLUSION OF M/H GROUP — BEGINNING OF M/H GROUP

Fig. 9 Wrap-Around of M/H Group

0 = NORMAL 8VSB DATA BYTE
1 = SIGNALING BYTE
2 = DUMMY BYTE
3 = TRELLIS INITIALIZATION BYTE (OR PLACEHOLDER FOR ONE)
4 = MHE PACKET HEADER BYTE
5 = BYTE OF PRESCRIBED DATA SEQUENCE
6 = M/H DATA BYTE
7 = BYTE TO FORCE INITIAL CONDITIONS OF M/H DATA BLOCK
8 = BYTE TO FORCE FINAL CONDITIONS OF M/H DATA BLOCK
9 = RS PARITY BYTE

Fig. 10 SYMBOLS USED TO IDENTIFY TYPES OF BYTES IN TRANSPORT PACKETS OF M/H GROUP

```
00000000000000000000099999220000000000000000000000000
                              ↓↓
00000000000000000000099999880000000000000000000000000
                              ↓↓
00000000000000000000099999880000000000000000000000000
                              ↓↓
0000000000000000000009999988000000000000000000000000
```

Fig. 11 MODIFIED DATA SEGMENT 6 OF M/H GROUP

```
00000000000000000000099999666000000000000000000000000
00000000000000000000099999666000000000000000000000000
00000000000000000000099999666000000000000000000000000
00000000000000000000099999666000000000000000000000000
```

Fig. 12 DATA SEGMENT 7 OF M/H GROUP PER PRIOR ART 0 0 0 0 0 0 0 0 0 0 0 0 6 6 6 9 9 9 9 0 0 0 0 0 0 0 0 0 0 0 0 0 0 0 0 0 0 0 0 0 0 0 0 0 0 0 0 0
0 0 0 0 0 0 0 0 0 0 0 0 0 8̤ 8̤ 9 9 9 9 9 0 0 0 0 0 0 0 0 0 0 0 0 0 0 0 0 0 0 0 0 0 0 0 0 0 0 0 0 0
0 0 0 0 0 0 0 0 0 0 0 0 0 8̤ 8̤ 9 9 9 9 9 0 0 0 0 0 0 0 0 0 0 0 0 0 0 0 0 0 0 0 0 0 0 0 0 0 0 0 0 0
0 0 0 0 0 0 0 0 0 0 0 0 0 8̤ 8̤ 9 9 9 9 9 0 0 0 0 0 0 0 0 0 0 0 0 0 0 0 <u>0 0 0 0 0 0</u> 0 0 0 0 0 0 0 0 0

Fig. 13 MODIFIED DATA SEGMENT 162 OF M/H GROUP 0 0 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6 0 0 0 0 0 0 0 0
0 0 6 6 6 6 6 6 6 6 6 6 6 6 6 6 6 6 6 6 6 6 6 6 6 6 6 6 6 6 6 6 6 6 6 6 6 6 6 6 6 0 0 0 0 0 0 0 0
0 0 6 6 6 6 6 6 6 6 6 6 6 6 6 6 6 6 6 6 6 6 6 6 6 6 6 6 6 6 6 6 6 6 6 6 6 6 6 6 6 0 0 0 0 0 0 0 0
0 0 6 6 6 6 6 6 6 6 6 6 6 6 6 6 6 6 6 6 6 6 6 6 6 6 6 6 6 6 6 6 6 6 6 6 6 6 6 6 6 0 0 0 0 0 0 0 0

Fig. 14 MODIFIED DATA SEGMENT 39 OF M/H GROUP 9 9 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤ 6̤
6̤ 6̤ 6 6 6 6 6 6 6 6 6 6 6 6 6 6 6 6 6 6 6 6 6 6 6 6 6 6 6 6 6 6 6 6 6 6 6 6 6 6 6 6 6 6 6 6 6 6
6 6 6 6 6 6 6 6 6 6 6 6 6 6 6 6 6 6 6 6 6 6 6 6 6 6 6 6 6 6 6 6 6 6 6 6 6 6 6 6 6 6 6 6 6 6 6 6
6 6 6 6 6 6 6 6 6 6 6 6 6 6 6 6 6 6 6 6 6 6 6 6 6 6 6 6 6 6 6 9 9 9 9 9 9 9 9 9 9 9 9 9 9 9 9 9

Fig. 15 MODIFIED DATA SEGMENT 91 OF M/H GROUP 9 9 0 0 0 0 0 0 0 0 0 0 0 0 0 0 0 0 0 0 0 0 0 0 0 0 0 0 0 0 0 0 0 6̤ 6̤ 6̤ 6̤ 6̤ 6̤ 6̤ 6̤ 6̤ 6̤ 6̤ 6̤ 6̤ 6̤ 6̤
6̤ 6̤ 0 0 0 0 0 0 0 0 0 0 0 0 0 0 0 0 0 0 0 0 0 0 0 0 0 0 0 0 0 6 6 6 6 6 6 6 6 6 6 6 6 6 6 9 9 9
9 9 0 0 0 0 0 0 0 0 0 0 0 0 0 0 0 0 0 0 0 0 0 0 0 0 0 0 0 0 0 6 6 6 6 6 6 6 6 6 6 6 6 6 6 9 9 9
9 9 0 0 0 0 0 0 0 0 0 0 0 0 0 0 0 0 0 0 0 0 0 0 0 0 0 0 0 0 0 6 6 6 6 6 6 6 6 6 6 6 6 6 6 6 9 9

Fig. 16 MODIFIED DATA SEGMENT 143 OF M/H GROUP

```
0000066666666666666666666666666666699999000000000
                            ↓↓↓↓↓↓↓↓↓↓↓↓
0000006666666666666666666663333333333339999900000000
00000666666666666666666666666666666666699999000000000
                            ↓↓↓↓↓↓↓↓↓↓↓↓
0000006666666666666666666666666666666669999900000000
```
Fig. 17 MODIFIED DATA SEGMENT 132 OF M/H GROUP
```
6699999000000000000000000000000000000006666666666666
6699999000000000000000000000000000000006666666666666
6699999000000000000000000000000000000006666666666666
                                              ↓↓↓↓↓↓↓
6699999000000000000000000000000000000006666666666666
```
Fig. 18 MODIFIED DATA SEGMENT 148 OF M/H GROUP
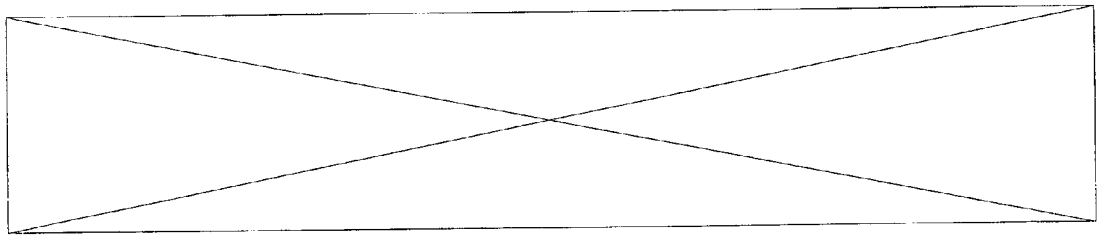
Fig. 19 MODIFIED DATA SEGMENT 21 OF M/H GROUP
```
444444444444444444444444444444444444444400000000000000
↓↓
6666666666666666666666666666666666666666600000000000000
6666666666666666666666666666666666666666600000000000000
6666666666666666666666666666666666666666600000000000000
```
Fig. 20 MODIFIED DATA SEGMENT 37 OF M/H GROUP

```
                                                      ↓↓
66666666666666666666666666666666666666666666666633333
33333335555555555555555555555555555555555555555555555
55555555555555555555555555555555555555555555555555555
55555555555555555555555555555555555555555555555555555
```

Fig. 21  MODIFIED DATA SEGMENT 67 OF M/H GROUP

```
6666666666666666666666666666666666666666666666666666
↓↓
6633333333333355555555555555555555555555555555555555
55555555555555555555555555555555555555555555555555555
55555555555555555555555555555555555555555555555555555
```

Fig. 22  MODIFIED DATA SEGMENT 83 OF M/H GROUP

```
                                  ↓↓
99999999966666666666666666666663333333333333555555555
55555555555555555555555555555555555555555555555555555
55555555555555555555555555555555555555555555555555555
55555555555555555555555555555555555555555555555555555
```

Fig. 23  MODIFIED DATA SEGMENT 99 OF M/H GROUP

```
                 ↓↓
00000000000000022999990000000000000000000000000000000
                 ↓
00000000000000029999900000000000000000000000000000000
00000000000000029999900000000000000000000000000000000
00000000000000029999900000000000000000000000000000000
```

Fig. 24  MODIFIED DATA SEGMENT 163 OF M/H GROUP

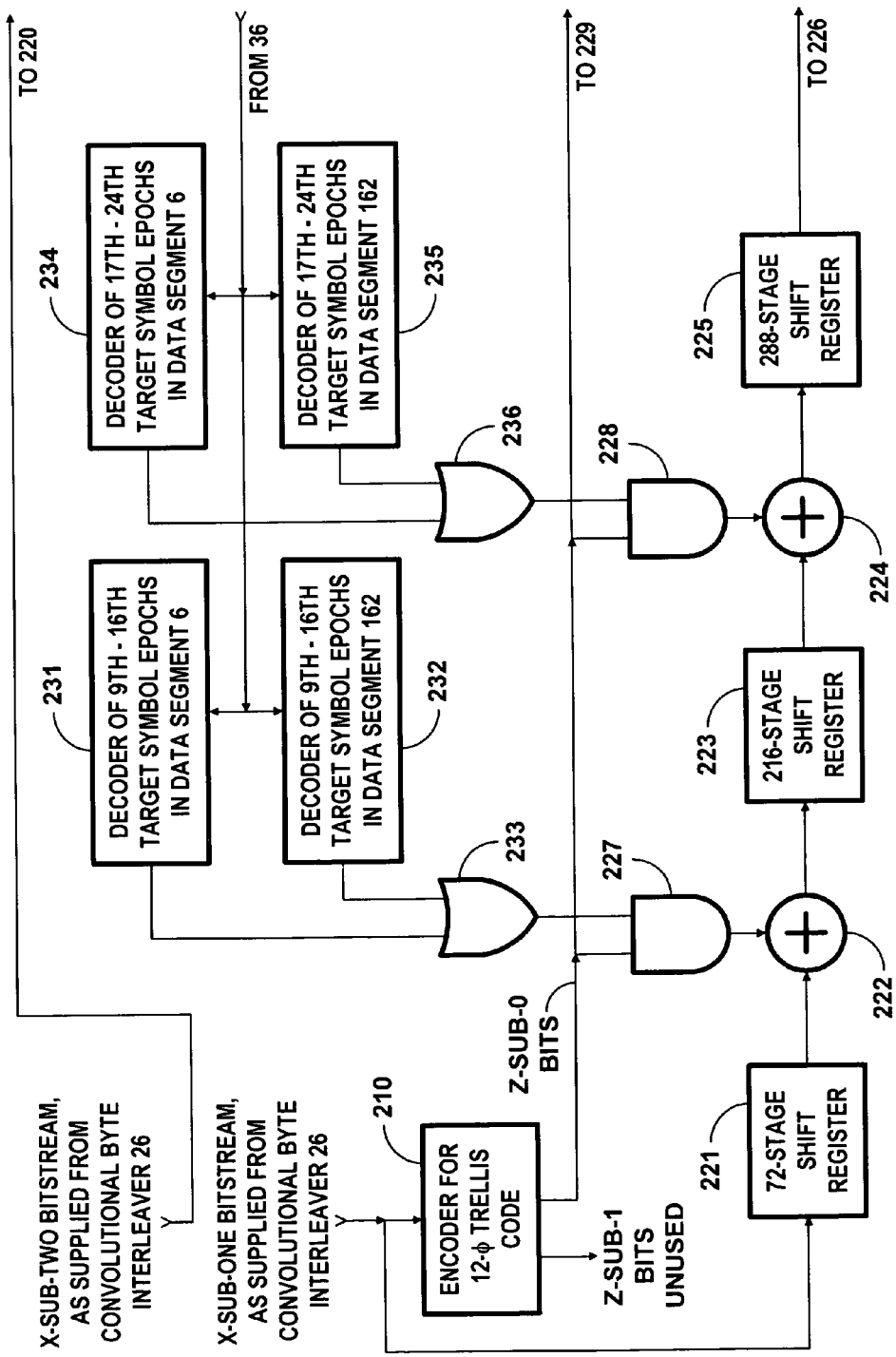
Fig. 25A Initial Portion of $X_1$ Bits Adjuster

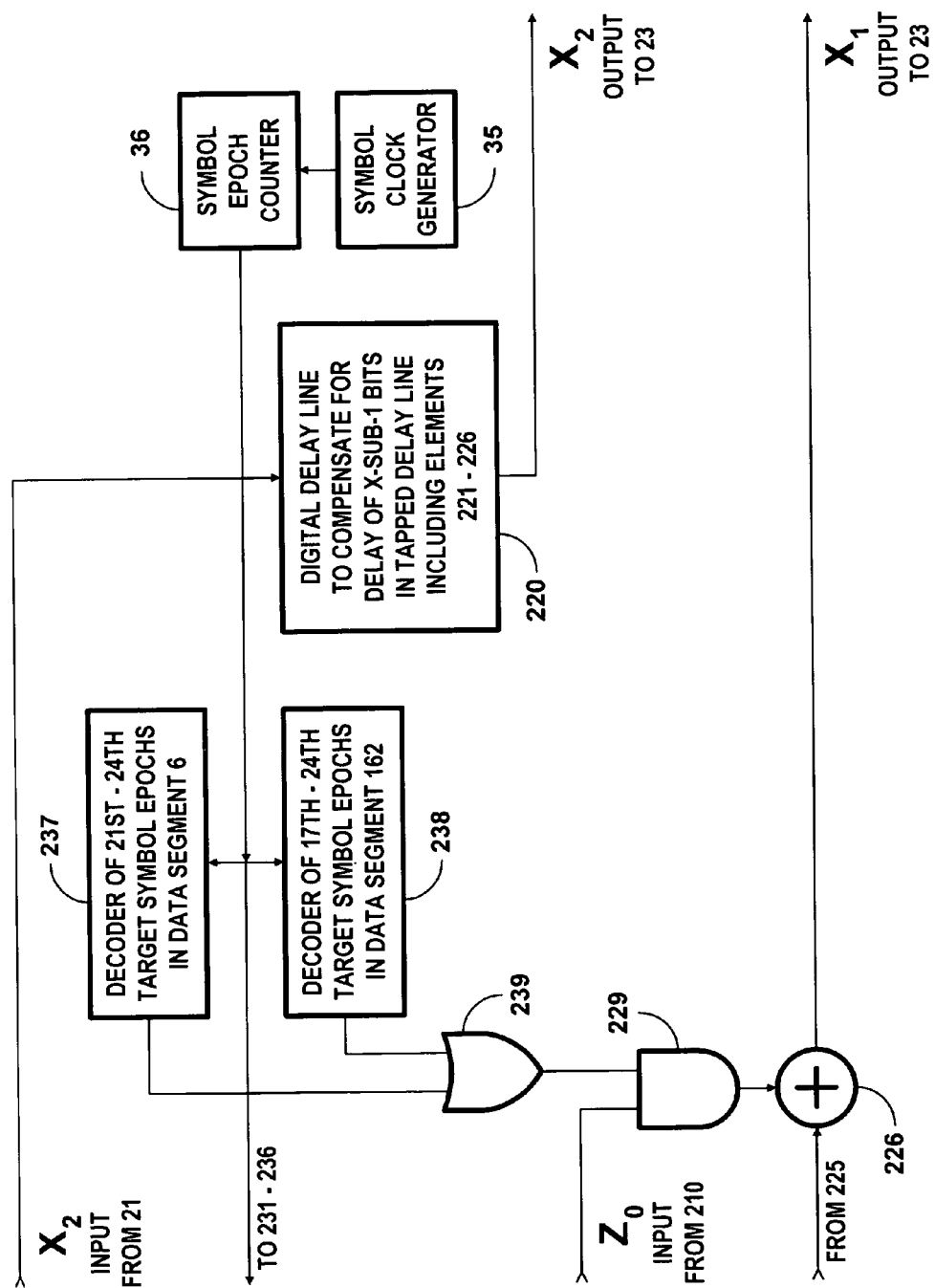
Fig. 25B Final Portion of $X_1$ Bits Adjuster

CR = CODE RATE OF OUTER CONVOLUTIONAL CODE
TNoG = TOTAL NO. OF GROUPS PER M/H FRAME IN M/H PARADE

Fig. 31 Transmission Parameter Channel Data

| SYNTAX | BITS | FORMAT |
|---|---|---|
| TPC_data { | | |
|   sub-frame_number | 1 - 3 | uimsbf |
|   slot_number | 4 - 7 | uimsbf |
|   parade_id | 8 - 14 | uimsbf |
|   starting_group_number | 15 - 18 | uimsbf |
|   number_of_groups_minus_one | 19 - 21 | uimsbf |
|   parade_repetition_cycle_minus_one | 22 - 24 | uimsbf |
|   rs_frame_mode | 25 - 26 | bslbf |
|   rs_code_mode_primary | 27 - 28 | bslbf |
|   rs_code_mode_secondary | 29 - 30 | bslbf |
|   ccc_block_mode | 31 - 32 | bslbf |
|   ccc_outer_code_mode_a | 33 - 34 | bslbf |
|   ccc_outer_code_mode_b | 35 - 36 | bslbf |
|   ccc_outer_code_mode_c | 37 - 38 | bslbf |
|   ccc_outer_code_mode_d | 39 - 40 | bslbf |
|   fic_version | 41 - 45 | uimsbf |
|   parade_continuity_counter | 46 - 49 | uimsbf |
|   If(sub-frame_number < 2) { | | |
|     total_number_of_groups_this_frame | 50 - 54 | uimsbf |
|     reserved | 55 - 59 | all 1's |
|   } | | |
|   If(sub-frame_number > 1) { | | |
|     total_number_of_groups_next_frame | 50 - 54 | uimsbf |
|     total_number_of_groups_this_frame | 55 - 59 | uimsbf |
|   } | | |
|   reserved | 60 - 75 | all 1's |
|   tpc_protocol_version_major_update | 76 - 77 | bslbf |
|   tpc_protocol_version_minor_update | 78 - 80 | bslbf |
| } | | |

Fig. 32 CCC OUTER CODE MODE

| CCC outer code mode | Description |
|---|---|
| 00 | THE OUTER CODE RATE OF A CCC BLOCK IS 1/2. |
| 01 | THE OUTER CODE RATE OF A CCC BLOCK IS 1/4. |
| 10 | THE OUTER CODE RATE OF A CCC BLOCK IS 1/3. |
| 11 | RESERVED |

Fig. 33 RS FRAME MODE

| RS frame mode | Description |
|---|---|
| 00 | THERE IS ONLY A PRIMARY RS FRAME BEGINNING IN BLOCK 4 & CONCLUDING IN BLOCK 3 AFTER WRAP AROUND. |
| 01 | THERE IS A PRIMARY RS FRAME BEGINNING IN BLOCK 4 & CONCLUDING IN BLOCK 8. THERE IS A SECONDARY RS FRAME BEGINNING IN BLOCK 8 & CONCLUDING IN BLOCK 3 AFTER WRAP AROUND |
| 10 | THERE IS ONLY A PRIMARY RS FRAME BEGINNING IN BLOCK 4 & CONCLUDING IN BLOCK 3 WITH NO WRAP AROUND. |
| 11 | THERE IS A PRIMARY RS FRAME BEGINNING IN BLOCK 4 & CONCLUDING IN BLOCK 8. THERE IS A SECONDARY RS FRAME BEGINNING IN BLOCK 8 & CONCLUDING IN BLOCK 3 WITH NO WRAP AROUND |

Fig. 34 RS CODE MODE

| RS code mode | RS Code | Number of Parity Bytes (P) |
|---|---|---|
| 00 | (230, 182) | 48 |
| 01 | (230, 194) | 36 |
| 10 | (230, 206) | 24 |
| 11 | RESERVED | |

| SUCCESSIVE M/H DATA FROM BLOCKS 4, 5, 6, 7, 8, 9 & 10 OF M/H GROUP #0 IN M/H SUB-FRAME 0 | SUCCESSIVE M/H DATA FROM BLOCKS 1, 2 & 3 OF M/H GROUP #0 |
|---|---|
| SUCCESSIVE M/H DATA FROM BLOCKS 4, 5, 6, 7, 8, 9 & 10 OF M/H GROUP #4 IN M/H SUB-FRAME 0 | SUCCESSIVE M/H DATA FROM BLOCKS 1, 2 & 3 OF M/H GROUP #4 |
| SUCCESSIVE M/H DATA FROM BLOCKS 4, 5, 6, 7, 8, 9 & 10 OF M/H GROUP #0 IN M/H SUB-FRAME 1 | SUCCESSIVE M/H DATA FROM BLOCKS 1, 2 & 3 OF M/H GROUP #0 |
| SUCCESSIVE M/H DATA FROM BLOCKS 4, 5, 6, 7, 8, 9 & 10 OF M/H GROUP #4 IN M/H SUB-FRAME 1 | SUCCESSIVE M/H DATA FROM BLOCKS 1, 2 & 3 OF M/H GROUP #4 |
| SUCCESSIVE M/H DATA FROM BLOCKS 4, 5, 6, 7, 8, 9 & 10 OF M/H GROUP #0 IN M/H SUB-FRAME 2 | SUCCESSIVE M/H DATA FROM BLOCKS 1, 2 & 3 OF M/H GROUP #0 |
| SUCCESSIVE M/H DATA FROM BLOCKS 4, 5, 6, 7, 8, 9 & 10 OF M/H GROUP #4 IN M/H SUB-FRAME 2 | SUCCESSIVE M/H DATA FROM BLOCKS 1, 2 & 3 OF M/H GROUP #4 |
| SUCCESSIVE M/H DATA FROM BLOCKS 4, 5, 6, 7, 8, 9 & 10 OF M/H GROUP #0 IN M/H SUB-FRAME 3 | SUCCESSIVE M/H DATA FROM BLOCKS 1, 2 & 3 OF M/H GROUP #0 |
| SUCCESSIVE M/H DATA FROM BLOCKS 4, 5, 6, 7, 8, 9 & 10 OF M/H GROUP #4 IN M/H SUB-FRAME 3 | SUCCESSIVE M/H DATA FROM BLOCKS 1, 2 & 3 OF M/H GROUP #4 |
| SUCCESSIVE M/H DATA FROM BLOCKS 4, 5, 6, 7, 8, 9 & 10 OF M/H GROUP #0 IN M/H SUB-FRAME 4 | SUCCESSIVE M/H DATA FROM BLOCKS 1, 2 & 3 OF M/H GROUP #0 |
| SUCCESSIVE M/H DATA FROM BLOCKS 4, 5, 6, 7, 8, 9 & 10 OF M/H GROUP #4 IN M/H SUB-FRAME 4 | SUCCESSIVE M/H DATA FROM BLOCKS 1, 2 & 3 OF M/H GROUP #4 |

Fig. 36 FLOW OF M/H DATA INTO FRAMESTORE FOR A PRIMARY RS FRAME WHEN THERE IS NO SECONDARY RS FRAME (READING FROM THE FRAMESTORE ADVANCES FROM LEFT TO RIGHT & FROM UP TO DOWN)

| |
|---|
| SUCCESSIVE M/H DATA FROM BLOCKS 4, 5, 6, 7 & 8 OF M/H GROUP #0 IN M/H SUB-FRAME 0 |
| SUCCESSIVE M/H DATA FROM BLOCKS 4, 5, 6, 7 & 8 OF M/H GROUP #4 IN M/H SUB-FRAME 0 |
| SUCCESSIVE M/H DATA FROM BLOCKS 4, 5, 6, 7 & 8 OF M/H GROUP #0 IN M/H SUB-FRAME 1 |
| SUCCESSIVE M/H DATA FROM BLOCKS 4, 5, 6, 7 & 8 OF M/H GROUP #4 IN M/H SUB-FRAME 1 |
| SUCCESSIVE M/H DATA FROM BLOCKS 4, 5, 6, 7 & 8 OF M/H GROUP #0 IN M/H SUB-FRAME 2 |
| SUCCESSIVE M/H DATA FROM BLOCKS 4, 5, 6, 7 & 8 OF M/H GROUP #4 IN M/H SUB-FRAME 2 |
| SUCCESSIVE M/H DATA FROM BLOCKS 4, 5, 6, 7 & 8 OF M/H GROUP #0 IN M/H SUB-FRAME 3 |
| SUCCESSIVE M/H DATA FROM BLOCKS 4, 5, 6, 7 & 8 OF M/H GROUP #4 IN M/H SUB-FRAME 3 |
| SUCCESSIVE M/H DATA FROM BLOCKS 4, 5, 6, 7 & 8 OF M/H GROUP #0 IN M/H SUB-FRAME 4 |
| SUCCESSIVE M/H DATA FROM BLOCKS 4, 5, 6, 7 & 8 OF M/H GROUP #4 IN M/H SUB-FRAME 4 |

Fig. 37 FLOW OF M/H DATA INTO FRAMESTORE FOR A PRIMARY RS FRAME WHEN THERE IS A SECONDARY RS FRAME (READING OF THE FRAMESTORE ADVANCES FROM LEFT TO RIGHT & FROM UP TO DOWN)

| SUCCESSIVE M/H DATA FROM BLOCKS 8, 9 & 10 OF M/H GROUP #0 IN M/H SUB-FRAME 0 | SUCCESSIVE M/H DATA FROM BLOCKS 1, 2 & 3 OF M/H GROUP #0 IN M/H SUB-FRAME 0 |
|---|---|
| SUCCESSIVE M/H DATA FROM BLOCKS 8, 9 & 10 OF M/H GROUP #4 IN M/H SUB-FRAME 0 | SUCCESSIVE M/H DATA FROM BLOCKS 1, 2 & 3 OF M/H GROUP #4 IN M/H SUB-FRAME 0 |
| SUCCESSIVE M/H DATA FROM BLOCKS 8, 9 & 10 OF M/H GROUP #0 IN M/H SUB-FRAME 1 | SUCCESSIVE M/H DATA FROM BLOCKS 1, 2 & 3 OF M/H GROUP #0 IN M/H SUB-FRAME 1 |
| SUCCESSIVE M/H DATA FROM BLOCKS 8, 9 & 10 OF M/H GROUP #4 IN M/H SUB-FRAME 1 | SUCCESSIVE M/H DATA FROM BLOCKS 1, 2 & 3 OF M/H GROUP #4 IN M/H SUB-FRAME 1 |
| SUCCESSIVE M/H DATA FROM BLOCKS 8, 9 & 10 OF M/H GROUP #0 IN M/H SUB-FRAME 2 | SUCCESSIVE M/H DATA FROM BLOCKS 1, 2 & 3 OF M/H GROUP #0 IN M/H SUB-FRAME 2 |
| SUCCESSIVE M/H DATA FROM BLOCKS 8, 9 & 10 OF M/H GROUP #4 IN M/H SUB-FRAME 2 | SUCCESSIVE M/H DATA FROM BLOCKS 1, 2 & 3 OF M/H GROUP #4 IN M/H SUB-FRAME 2 |
| SUCCESSIVE M/H DATA FROM BLOCKS 8, 9 & 10 OF M/H GROUP #0 IN M/H SUB-FRAME 3 | SUCCESSIVE M/H DATA FROM BLOCKS 1, 2 & 3 OF M/H GROUP #0 IN M/H SUB-FRAME 3 |
| SUCCESSIVE M/H DATA FROM BLOCKS 8, 9 & 10 OF M/H GROUP #4 IN M/H SUB-FRAME 3 | SUCCESSIVE M/H DATA FROM BLOCKS 1, 2 & 3 OF M/H GROUP #4 IN M/H SUB-FRAME 3 |
| SUCCESSIVE M/H DATA FROM BLOCKS 8, 9 & 10 OF M/H GROUP #0 IN M/H SUB-FRAME 4 | SUCCESSIVE M/H DATA FROM BLOCKS 1, 2 & 3 OF M/H GROUP #0 IN M/H SUB-FRAME 4 |
| SUCCESSIVE M/H DATA FROM BLOCKS 8, 9 & 10 OF M/H GROUP #4 IN M/H SUB-FRAME 4 | SUCCESSIVE M/H DATA FROM BLOCKS 1, 2 & 3 OF M/H GROUP #4 IN M/H SUB-FRAME 4 |

Fig. 38 FLOW OF M/H DATA INTO FRAMESTORE FOR A SECONDARY RS FRAME (READING OF THE FRAMESTORE ADVANCES FROM LEFT TO RIGHT & FROM UP TO DOWN)

TERMINATED CONCATENATED CONVOLUTIONAL CODING OF M/H GROUP DATA IN 8VSB DIGITAL TELEVISION SIGNALS

This is a continuation-in-part of U.S. patent application Ser. No. 12/660,757 filed 4 Mar. 2010, now abandoned which claimed the benefit of the filing dates of provisional U.S. Pat. App. Ser. No. 61/209,141 filed 4 Mar. 2009, of provisional U.S. Pat. App. Ser. No. 61/215,764 filed 9 May 2009, of provisional U.S. Pat. App. Ser. No. 61/280,626 filed 6 Nov. 2009, and of provisional U.S. Pat. App. Ser. No. 61/335,246 filed 4 Jan. 2010.

The invention relates to transmitter apparatus for over-the-air broadcasting of 8VSB digital television (DTV) signals that incorporate M/H Slot data and receiver apparatus for recovering M/H Slot data from such broadcast DTV signals.

BACKGROUND OF THE INVENTION

The Advanced Television Systems Committee (ATSC) published a Digital Television Standard in 1995 as Document A/53, hereinafter referred to simply as "A/53" for sake of brevity. In October 2009 ATSC published an ATSC Mobile DTV Standard, Parts 1-8 as Document A/153, referred to hereinafter simply as "A/153" and incorporated herein by reference. A/153 is directed to transmitting ancillary signals in time division multiplex with 8VSB DTV signals, which ancillary signals are designed for reception by mobile receivers and by hand-held receivers. The ancillary data are randomized and subjected to transverse Reed-Solomon (TRS) coding before concatenated convolutional coding (CCC) that uses the 12-phase 2/3 trellis coding of 8VSB as inner convolutional coding. A/153 prescribes serial concatenated convolutional coding (SCCC), but parallel concatenated convolutional coding (PCCC) that uses the 12-phase 2/3 trellis coding of 8VSB as inner convolutional coding can be used instead. U.S. patent application Ser. No. 12/580,534 filed for A. L. R. Limberg on 16 Oct. 2009 and titled "Digital television systems employing concatenated convolutional coded data" describes such PCCC that uses single-phase outer convolutional coding. This application was published 22 Apr. 2010 as US-2010-0100793-A1. Provisional U.S. Pat. App. Ser. No. 61/335,246 filed for A. L. R. Limberg on 4 Jan. 2010 and titled "Coding and decoding of RS Frames in 8VSB digital television signals intended for reception by mobile/handheld receivers" describes PCCC that uses 12-phase outer convolutional coding instead.

A/153 contemplated the use of receivers designed for selective reception of M/H Groups with the receiver being in large measure turned off when other M/H Groups would otherwise be received. When considering the design of such a receiver, the inventor discovered that the technical experts preparing A/153 apparently failed to notice a shortcoming with regard to providing for such selective reception. A/153 contains no provision for placing the parity bits of inner convolutional coding into prescribed initial states at the beginning of each M/H Group. Accordingly, the receiver designed for selective reception of M/H Groups has to rely on chance for correct synchronization of the decoder for the inner convolutional coding to occur at the outsets of the Groups selected for reception. This problem arises because the 2/3 trellis coding used as the inner outer convolutional coding continues through the ordinary 8VSB signals between M/H Groups.

This problem can be overcome by modifying certain bytes at the beginning of CCC in each M/H Group to reset the twelve 2/3 trellis encoders at the 8VSB DTV transmitter to prescribed states as CCC continues within the Group. The inventor observed that there were dummy bytes in the beginning of each M/H Group as CCC started. The inventor ascertained that these dummy bytes are so positioned within the M/H Group that there is the possibility that they can be modified to reset the 12-phase 2/3 trellis encoder at the 8VSB DTV transmitter to prescribed states before CCC continues within the M/H Group. The resetting of the twelve 2/3 trellis encoders to place the 12-phase 2/3 trellis encoder in standard starting states is termed "trellis-initialization" in this specification and the claims that follow, no matter when this resetting is performed within an M/H Group. When the most significant bits of 8VSB symbols are subjected to 12-phase pre-coding to compensate for post-comb filtering in receivers, "trellis-initialization" also includes resetting of the 12-phase pre-coder to standard starting states.

The outer convolutional coding does not continue between M/H Groups. So, the outer convolutional coding can be begun again from a prescribed initial state at the beginning of each M/H Group. Neither the outer convolutional coding nor the 2/3 trellis coding used as the inner outer convolutional coding are specified in A/153 as being terminated to prescribed states or as using tail-biting. This reduces the efficiency of turbo decoding procedures and will often increase the number of iterations required to suppress decoding errors. The literature describes turbo decoding being done on a bi-directional basis, reversing the direction of decoding every iteration, which is reported to facilitate selection of the most likely codeword in portions of the signal where certainty is below average. Reverse-direction decoding is easier if zero-flushing or tail-biting procedures terminate the CCC, so the receiver has full knowledge of the final decoding states, rather than having to guess them. Termination of CCC is of less concern when the coding is of extended duration, which is the case in M/H. Employing reverse-direction decoding when turbo decoding the CCC within a Group is more complicated, however, because the receiver has to work backward from a plurality of possible concluding states, rather than from a single concluding state that is prescribed.

The inventor discerned that the conclusion of the inner convolutional coding can also be terminated by modifying certain bytes at the beginning of each M/H Group to reset the 12-phase 2/3 trellis encoder at the 8VSB DTV transmitter so as to have prescribed states thereafter. The inventor observed that there were dummy bytes in each M/H Group as CCC therein concluded. The inventor ascertained that these dummy bytes are so positioned within the M/H Group that there is the possibility that they can be modified to reset the 12-phase 2/3 trellis encoder at the 8VSB DTV transmitter to prescribed states immediately after CCC concludes within the M/H Group.

The inventor discerned that resetting the 12-phase encoder for 2/3 trellis coding to standard states both at the beginning of each M/H Group and at the conclusion of each M/H Group is a practical way to implement tail-biting of the inner convolutional coding. This procedure spares the M/H transmitter apparatus having to store the states of the 12-phase 2/3 trellis coding at the beginning of each M/H Group until the conclusion of that Group. This procedure facilitates burst reception of M/H Groups by M/H receiver apparatus. The receiver when it is powered up at the beginning of each M/H Group will reliably know a priori the states of the 12-phase 2/3 trellis coding and can begin its decoding straightaway. The memory associated with the 12-phase decoder for the 2/3 trellis coding can select just the M/H Group for temporary storage to support turbo decoding.

Trellis-initialization is not suited to terminating the conclusion of the outer convolutional coding transmitted within an M/H Group. This is because of the time order of the 2-bit symbols of the outer convolutional coding being shuffled before the inner convolutional coding. Instead, termination of the outer convolutional coding at its conclusion is done by zero-flushing or tail-biting methods performed by the encoder for the outer convolutional coding.

The inventor discerned that trellis-initialization can be used to partition an M/H Group into first portion and second portions, which first portion can be decoded to supply part of a primary RS Frame and which second portion can be decoded to supply part of a secondary RS Frame. Preferably, the outer convolutional coding in the first portion of the M/H Group is terminated at its conclusion, and the outer convolutional coding in the second portion of the M/H Group is terminated at its conclusion. The M/H data transmitted in the each RS Frame are randomized independently of MH data in other RS Frames.

The locations where trellis-initialization is to occur can be chosen such that the sizes of the primary and secondary RS Frames are in a simple ratio that facilitates the efficient packing of both those RS Frames with TRS codewords of a common length. Arranging the size of the primary RS Frames to be twice or thrice the size of RS secondary frames can be advantageous for developing programming for M/H transmission, since the lengths of the DTV programs can be standardized to facilitate scheduling.

It is advantageous to use the trellis-initialization preceding the earlier training signal in the M/H Group as one of the two trellis-initializations used for separating the primary and secondary RS Frames. Decoding of the first portion of the M/H Group begins immediately after the earlier training signal and concludes just after the later trellis-initialization between the first and second portions of the M/H Group. Decoding of the first portion of the M/H Group then begins just after the later trellis-initialization. The trellis-initialization at the conclusion of the M/H Group and the trellis-initialization at the beginning of the M/H Group allow the second portion of the M/H Group to be wrapped around. The second portion of the M/H Group then concludes with the trellis-initialization preceding the earlier training signal in the M/H Group.

If the MH Group encodes M/H data just for a primary RS Frame and not for a secondary RS Frame, the encoding of the M/H data can begin soon after the trellis-initialization at the beginning of the M/H Group and conclude with the trellis-initialization at the conclusion of the M/H Group. Alternatively, the encoding of the M/H data can begin immediately after the earlier training signal and conclude with the trellis-initialization preceding the earlier training signal in the M/H Group. That is, there will be wrap-around of the encoding from the trellis-initialization at the conclusion of the M/H Group to soon after the trellis-initialization at the beginning of the M/H Group. This latter alternative may facilitate more uniform turbo decoding procedures whether or not secondary RS Frames are used.

SUMMARY OF THE INVENTION

In accordance with an aspect of the invention a transmitter for 8VSB digital television (DTV) signals that incorporate M/H Groups of concatenated convolutionally coded (CCC) data includes apparatus arranging for a respective trellis-initialization close to the beginning of each M/H Group. In accordance with a further aspect of the invention such a transmitter includes apparatus arranging for a respective further trellis-initialization close to the conclusion of each M/H Group. In accordance with a still further aspect of the invention, such a transmitter includes apparatus arranging for at least one respective still further trellis-initialization of the 2/3 trellis coding within each M/H Group. This at least one respective still further trellis-initialization separates the M/H Group into first and second portions that can be separately decoded.

Another aspect of the invention concerns the use of trellis-initialization to apportion the sizes of primary and secondary RS Frames such that both types of RS Frame can be efficiently packed with transverse Reed-Solomon (TRS) codewords of a standardized length.

Other aspects of the invention concern receivers for 8VSB DTV signals that incorporate CCC M/H Group data with inner convolutional coding that begins from prescribed encoder states and concludes with prescribed encoder states. In such a receiver embodying a further aspect of the invention, states of a twelve-phase inner convolutional decoder for symbol-interleaved outer convolutional coding are automatically reset to prescribed values by trellis-initializations near the beginning and the conclusion of each M/H Group in the final trellis-coded transmissions.

BRIEF DESCRIPTION OF THE DRAWING

FIG. 7 is a timing diagram depicting the transition from main-service symbols to M/H-service symbols in 8-VSB transmissions when beginning an M/H Group with initialization of the trellis coding of Z-sub-1 and Z-sub-0 bits.

FIG. 8 is a timing diagram depicting the transition from M/H-service symbols to main-service symbols in 8-VSB transmissions when concluding an M/H Group with initialization of the trellis coding of Z-sub-1 and Z-sub-0 bits.

FIG. 9 is a timing diagram depicting the wrap-around of the trellis coding of Z-sub-1 and Z-sub-0 bits in each M/H Group as read from memory in an M/H receiver to its turbo decoder in accordance with an aspect of the invention.

FIG. 10 is a legend describing the types of bytes incorporated in the data segments of 8VSB transmissions of M/H data diagrammed in FIGS. 11 through 23.

FIGS. 11 and 12 are diagrams of the byte contents of data segments 6 and 7 respectively of an M/H Group as shown in Appendix A.2 of A/153, Part 2, but modified in accordance with an aspect of the invention to include a trellis-initialization to permit the 2/3 trellis coding used as the inner convolutional coding of each M/H Group to proceed from prescribed beginning states near the conclusion of the data segment 6.

FIG. 13 is a diagram of the byte contents of data segment 162 of an M/H Group shown in Appendix A.2 of A/153, Part 2, but modified in accordance with an aspect of the invention to include a trellis-initialization to terminate the conclusion of the 2/3 trellis coding used as the inner convolutional coding of each M/H Group with prescribed concluding states that are the same as the prescribed beginning states.

FIGS. 14, 15 and 16 are diagrams of the byte contents of data segments 39, 91 and 143 of the M/H Group showing their being modified in accordance with an aspect of the invention to replace the third bytes of the headers of M/H-encapsulating packets with M/H data bytes.

FIG. 17 is a diagram of the byte contents of data segment 132 of the M/H Group showing its being modified in accordance with an aspect of the invention to include deterministic trellis initialization to separate and define new primary and secondary RS Frames, as well as to replace dummy bytes with M/H data bytes.

FIGS. 18 through 23 are diagrams of the byte contents of data segments 148, 21, 37, 67, 83 and 99 of the M/H Group as shown in Appendix A.2 of A/153, Part 2, but modified in accordance with an aspect of the invention to replace dummy bytes with M/H data bytes.

FIG. 24 is a diagram of the byte contents of data segment 163 of an M/H Group shown in Appendix A.2 of A/153, Part 2, but modified to replace M/H data bytes following the trellis-initialization with dummy bytes.

FIGS. 25A and 25B combine to form FIG. 25, a schematic diagram of the X-sub-1 bits adjuster in the M/H post-processor shown in FIG. 2, which X-sub-1 bits adjuster in accordance with an aspect of the invention initializes the trellis coding of Z-sub-1 and Z-sub-0 bits at the beginning and conclusion of each M/H Group.

FIG. 31 is a table depicting the syntax of the Transmission Parameter Channel (TPC) data encoded by the FIG. 30 signaling encoder.

FIG. 32 is a table depicting in more detail the syntax of the ccc_outer_code_mode elements of the FIG. 31 table.

FIG. 33 is a table depicting in more detail the syntax of the rs_Frame_mode element of the FIG. 31 table.

FIG. 34 is a table depicting in more detail the syntax of the rs_code_mode elements of the FIG. 31 table.

FIG. 36 is a depiction of M/H data flow into RS framestore memory in the DTV receiver apparatus of FIG. 35B when there is a primary RS Frame being received that is not accompanied by a secondary RS Frame during transmission.

FIG. 37 is a depiction of M/H data flow into RS framestore memory in the DTV receiver apparatus of FIG. 35B when there is a primary RS Frame being received that is accompanied by a secondary RS Frame during transmission.

FIG. 38 is a depiction of M/H data flow into RS framestore memory in the DTV receiver apparatus of FIG. 35B when there is a secondary RS Frame being received.

DETAILED DESCRIPTION

Figure 1:
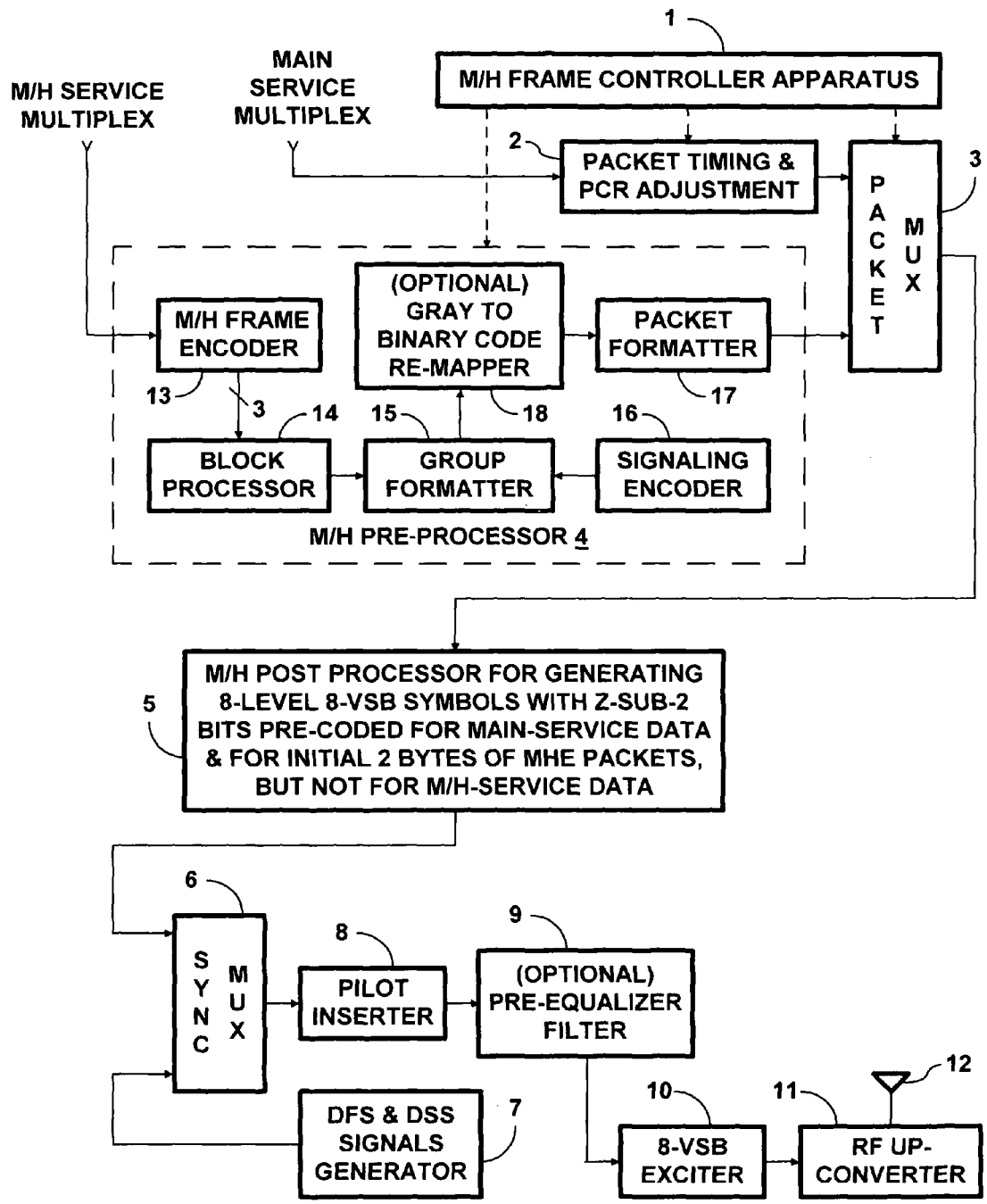
FIG. 1 is a schematic diagram of DTV transmitter apparatus for broadcasting signals to mobile receivers and to hand-held receivers in accordance with aspects of the invention, differing from prior-art DTV transmitter apparatus with regard to the M/H Frame encoder and the block processor in the M/H pre-processor and with regard to the M/H post-processor.

FIG. 1 shows transmitter apparatus for broadcast DTV signals including those intended for reception by mobile receivers and by hand-held receivers, which receivers are collectively referred to as "M/H receivers". The transmitter apparatus receives two sets of input streams, one composed of the MPEG transport-stream (TS) packets of the main-service data and the other composed of IP TS packets of the M/H-service data. The M/H-service data are encapsulated in 208-byte-long MPEG-like TS packets before emission, which MPEG-like TS packets are called "M/H encapsulating packets" or "MHE packets". This avoids disrupting the reception of the main-service data by legacy 8-VSB receivers. The FIG. 1 transmitter apparatus combines the MPEG TS packets of the main-service data and the internet-protocol TS packets of the M/H-service data within one stream of MPEG or MPEG-like TS packets, then processes the combined stream to be transmitted as an ATSC trellis-coded 8-VSB signal.

M/H Frame controller apparatus 1 controls these procedures. The main-service multiplex stream of data is supplied to packet timing and PCR adjustment circuitry 2 before the packets of that stream are routed to a packet multiplexer 3 to be time-division multiplexed with MHE packets encapsulating M/H-service data. (PCR is the acronym for "Program Clock Reference".) Because of their time-division multiplexing with the MHE packets encapsulating M/H-service data, changes have to be made to the time of emission of the main-service stream packets compared to the timing that would occur with no M/H stream present. The packet timing and PCR adjustment circuitry 2 makes these timing changes responsive to control signals supplied thereto from the M/H Frame controller apparatus 1. The packet multiplexer 3 time-division multiplexes the main-service TS packets with TS packets encapsulating M/H-service data, as directed by control signals from the M/H Frame controller apparatus 1. The operations of the M/H transmission system on the M/H data are divided into two stages: the M/H pre-processor 4 and the M/H post-processor 5.

The M/H-service multiplex stream of data is supplied to the M/H pre-processor 4 for processing. The pre-processor 4 rearranges the M/H-service data into an M/H data structure, enhances the robustness of the M/H-service data by additional coding procedures, inserts training sequences, and subsequently encapsulates the processed enhanced data within MHE packets, thus to generate an ancillary transport stream (TS). The MHE packets are supplied to the packet multiplexer 3 after data encapsulation within their payload fields is completed. The operations performed by the pre-processor 4 include M/H Frame encoding, block processing, Group formatting, optional Gray-code-to-natural-binary-code conversion, packet formatting, and encoding M/H signaling. The M/H Frame controller apparatus 1 provides the necessary transmission parameters to the pre-processor 4 and controls the multiplexing of the main-service TS packets and the M/H-service TS packets by the packet multiplexer 3 to organize the M/H Frame. Preferably, the pre-processor 4 differs from that described in A/153 in regard to the M/H Frame encoding, in regard to the block processing and in regard to Gray-code-to-natural-binary-code conversion. The block processing includes capability for the generation of parallel concatenated convolutional coding (PCCC) that has half the code rate of 8-VSB transmissions of the type originally prescribed by A/53.

The post-processor 5 processes the main-service TS packets by normal 8-VSB encoding and re-arranges the pre-processed M/H-service TS packets in the combined stream to assure backward compatibility with ATSC 8-VSB. The post-processor 5 differs from that described in A/153 in that pre-coding of the most significant bits of 8-VSB symbols is disabled when the symbols describe M/H-service data. Consequently, receivers need not use post-comb filtering of the most significant bits of 8-VSB symbols during reception of M/H-service data, avoiding the loss in signal-to-noise ratio associated with such filtering. Disabling the pre-coding of the most significant bits of 8-VSB symbols descriptive of M/H-service data allows the use of Gray-code labeling of outer convolutional coding of the CCC and also allows the use of PCCC. The most significant bits of 8-VSB symbols descriptive of main-service TS packets are pre-coded, so as not to disrupt the operation of legacy receivers. Main-service data in the combined stream are processed exactly the same way as for ordinary 8-VSB transmission: randomizing, Reed-Solomon (RS) encoding, convolutional byte interleaving, and trellis encoding. The M/H-service data in the combined stream are processed differently from the main-service data, with the pre-processed M/H-service data bypassing data randomization. The pre-processed MHE packets are subjected to non-systematic RS encoding, which re-arranges the bytes of those packets within RS codewords. The non-systematic. RS encoding allows the insertion of the regularly spaced long training sequences so as not to disrupt the operation of legacy receivers. Additional operations are done on the pre-processed M/H-service data to initialize the trellis encoder memories at the beginning of each training sequence included in the pre-processed M/H-service data.

A synchronization multiplexer 6 is connected for receiving, as the first of its two input signals, the 2/3 trellis-coded data generated by the post-processor 5. The sync multiplexer 6 is connected for receiving its second input signal from a generator 7 of synchronization signals comprising the data segment sync (DSS) and the data field sync (DFS) signals. Per custom, the DSS and DFS signals are time-division multiplexed with the 2/3 trellis-coded data in the output signal from the sync multiplexer 6, which is supplied to a pilot inserter 8 as input signal thereto. The pilot inserter 8 introduces a direct-component offset into the signal to cause a pilot carrier wave to be generated during subsequent balanced modulation of a suppressed intermediate-frequency (IF) carrier wave. The output signal from the pilot inserter 8 is a modulating signal with offset, which optionally is passed through a pre-equalizer filter 9 before being supplied as input signal to an 8-VSB exciter 10 to modulate the suppressed IF carrier wave. Alternatively, the pre-equalizer filter 9 precedes the pilot inserter 8 in their cascade connection with each other. Other transmitter designs omit the pre-equalizer filter 9 in favor of a direct connection. The 8-VSB exciter 10 is connected for supplying the suppressed IF carrier wave to a radio-frequency (RF) up-converter 11 to be converted upward in frequency to repose within the broadcast channel. The up-converter 11 also amplifies the power of the RF signal it applies to a broadcast antenna 12.

More specifically, the M/H pre-processor 4 comprises an M/H Frame encoder 13, a block processor 14, a Group formatter 15, a signaling encoder 16, a packet formatter 17 and optionally a Gray-code-to-binary-code re-mapper 18. The M/H-service multiplex stream of data supplied to the M/H pre-processor 4 is applied as input signal to the M/H Frame encoder 13, which provides transverse Reed-Solomon (TRS) coding of that data. Each M/H Frame is composed of one or more RS Frames, each comprising a TRS Frame of TRS coding. The data in each TRS Frame are randomized independently from each other and from the data of the main-service multiplex. The TRS-coded M/H data are subsequently further coded with a byte-error-locating block code that M/H receivers can utilize for locating byte errors in the TRS codewords. This byte-error-locating block coding replaces the periodic cyclic-redundancy-check (CRC) coding prescribed by A/153. In a departure from the prior art, the codewords of this byte-error-locating block coding have a prescribed standard length in number of 8-bit bytes, irrespective of TNoG, the total number of M/H Groups in each M/H Frame. This byte-error-locating block coding can be CRC coding or can be lateral Reed-Solomon (LRS) forward-error-correction (FEC) coding. The inventor's published patent application US-2010-0100793-A1, teaches that byte-error-locating CRC coding is better done for each the M/H Groups in an M/H Frame on an individual basis, rather than for all those M/H Groups on a collective basis. This is particularly advantageous for PCCC transmissions, since the CRC coding can be used to mitigate any BER floor problem that is experienced during reception of such transmissions. LRS FEC coding can be used for this purpose in place of the CRC coding and can be used to facilitate turbo coding further by correcting errors. The standard length of the codewords of the byte-error-locating block coding is chosen such that an integral number of those codewords fits exactly within the portion of each RS Frame conveyed by an individual M/H Group. This permits the M/H Frame encoder 13 to use a single encoder for the byte-error-locating block coding for every RS Frame, no matter its size. This departs from the prior-art practice of having a respective encoder for the CRC coding of each RS Frame in an M/H Frame.

The M/H Frame encoder 13 is connected for supplying the byte-error-locating block codewords to the block processor 14, as input signal thereto. The block processor 14 includes apparatus for generating outer convolutional coding in response to the byte-error-locating block codewords of TRS-coded M/H -service data. This apparatus includes an encoder for outer convolutional coding at a code rate one half the 8-VSB symbol rate. This encoder is preferably preceded by a bit de-interleaver and succeeded by a symbol interleaver for the two-bit symbols generated at the code rate one half the 8-VSB symbol rate. The bit de-interleaver and the symbol interleaver are complementary to each other to provide "implied interleaving" for M/H data bits (or "code interleaving" for parity bits). Implied symbol interleaving preserves the original order of the successive M/H data bits within the CCC, whether it be SCCC or PCCC. Implied symbol interleaving of CCC avoids dispersion of burst errors in the received CCC. Such dispersion would adversely effect the capability of TRS coding to overcome burst errors.

The Group formatter 15 is connected for receiving the interleaved outer convolutional coding from the block processor 14 as input addressing signal. The Group formatter 15 includes an interleaved Group format organizer that operates on the Group format as it will appear after the ATSC data interleaver. The interleaved Group format organizer maps the FEC coded M/H-service data from the block processor into the corresponding M/H blocks of a Group, adding pre-determined training data bytes and data bytes to be used for initializing the trellis encoder memories. The interleaved Group format organizer inserts headers for the MHE packets, preferably truncated to just 2-byte length to accommodate more bytes of M/H data in those packets. The interleaved Group format organizer also inserts place-holder bytes for main-service data and for non-systematic RS parity. The interleaved Group format organizer inserts a few dummy bytes to complete construction of the intended Group format. The interleaved Group format organizer assembles a group of 118 consecutive TS packets. Some of these TS packets are composed of the interleaved outer convolutional coding supplied by the block processor 14. A signaling encoder 16 generates others of these TS packets.

Still others of these TS packets are prescribed training signals stored in read-only memory within the Group formatter 15 and inserted at prescribed intervals within the group. The prescribed training signals inserted by the Group formatter 15 in FIG. 1 will differ from those described in A/153 if the Z-sub-2 bits of the training signal symbols are modified to take into account the pre-coding of those bits being selectively discontinued during M/H signals. The apparatus for selective discontinuation of such pre-coding is described in more detail further on in this specification, with reference to FIG. 3 of the drawing. However, because transmitter apparatus constructed for implementing A/153 is already in the field, it is more likely that the Z-sub-2 bits of the training signal symbols will be pre-coded, avoiding the Group formatter 15 having to be modified in this regard. The Group formatter 15 may differ from that prescribed by A/153 in the way that M/H Blocks are mapped into M/H Groups. This difference is described in detail further on in this application, with reference to FIG. 6 of the drawing.

The M/H transmission system has two kinds of signaling channels generated by the signaling encoder 16. One is the Transmission Parameter Channel (TPC), and the other is the Fast Information Channel (FIC). The TPC is for signaling the M/H transmission parameters such as various FEC modes and M/H Frame information. The FIC is provided to enable a receiver to acquire a broadcast service quickly, and the FIC contains cross-layer information between the physical layer of the receiver and its upper layer(s). The "physical layer" of the receiver is that portion of the receiver used to recover the IP transport stream, and the succeeding "upper layer" processes the IP transport stream. The TPC and FIC signals are encoded within parallel concatenated convolutional coding that has a code rate one-quarter the 8-VSB symbol rate.

Within the Group formatter 15 the interleaved Group format organizer is followed in cascade connection by a byte de-interleaver that complements the ATSC convolutional byte interleaver. The Group formatter 15 is connected for supplying the response of this de-interleaver as its output signal, which is applied as input signal to the Gray-code-to-binary-code re-mapper 18. The re-mapper 18 recodes 2-bit symbols of its input signal, which is considered to be in reflected-binary (Gray) code, to the natural-binary code that governs the modulating signal used in 8-VSB amplitude modulation. This implements a procedure known as "Gray-code labeling". The conversion is performed by exclusive-ORing the least significant bit (LSB) of each 2-bit symbol of the re-mapper 18 input signal with the most significant bit (MSB) thereof to generate the LSB of the re-mapper 18 output signal. The MSB of the re-mapper 18 output signal reproduces the MSB of the re-mapper 18 input signal. The MSB and the LSB of the re-mapper 18 output signal respectively correspond to bits referred to as the "X-sub-2 bit"and the "X-sub-1 bit" during subsequent trellis coding procedure. The Gray-code-to-binary-code re-mapper 18 recodes the quarter-rate PCCC encoding the TPC and FIC signals unless provision is made for the re-mapper 18 not to do so. The re-mapper 18 output signal is supplied to the packet formatter 17.

The inclusion of the Gray-code-to-binary-code re-mapper 18 in the FIG. 1 transmitter apparatus is optional. If the re-mapper 18 is not included, the output signal from the Group formatter 15 is supplied directly to the packet formatter 17 as input signal thereto. In an initial procedure therein, the packet formatter 17 expunges the main-service data place holders and the RS parity place holders that were inserted by the interleaved Group format organizer for proper operation of the byte de-interleaver in the Group formatter 15. The packet formatter 17 inserts an MPEG TS sync byte before each 187-byte data packet as a prefix thereof. The packet formatter 17 supplies 118 M/H-service transport-stream packets per group to the packet multiplexer 3, which time-division multiplexes the M/H-service TS packets and the main-service TS packets to construct M/H Frames.

The M/H Frame controller apparatus 1 controls the packet multiplexer 3 in the following way when the packet multiplexer schedules the 118 TS packets from the packet formatter 17. Thirty-seven packets immediately precede a DFS segment in a 313-segment VSB field of data, and another eighty-one packets immediately succeed that DFS segment. The packet multiplexer 3 reproduces next-in-sequence main-service TS packets in place of MPEG null packets that contain place-holder bytes for main-service data in their payload fields. The packet multiplexer 3 is connected to supply the TS packets it reproduces to the M/H post-processor 5 as input signal thereto.

Figure 2:
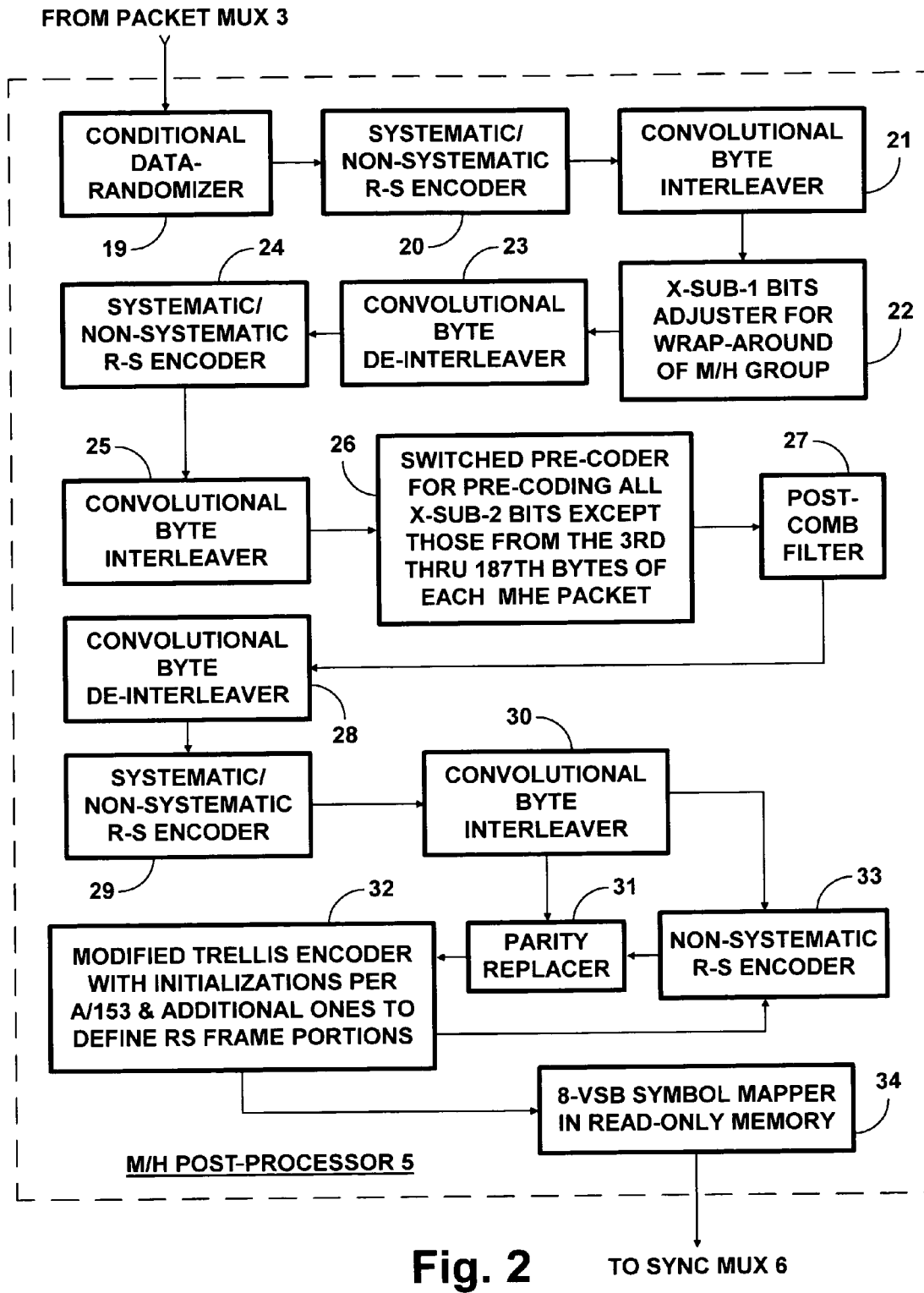
FIG. 2 is a detailed schematic diagram of a preferred M/H post-processor for the FIG. 1 DTV transmitter apparatus, which M/H post-processor is of a novel type that discontinues interference-filter pre-coding of X-sub-2 bits during the transmission of coded M/H data and that provides wrap-around trellis coding of the X-sub-1 bits in each M/H Group.

FIG. 2 shows in more detail a representative embodiment of the M/H post-processor 5 as constructed in accordance with inventive precepts disclosed herein. The M/H post-processor 5 includes a conditional data randomizer 19 operated as prescribed by A/153, Part 2, §5.3.2.2.1.1 "M/H Randomizer". FIG. 2 shows the packet multiplexer 3 connected to apply the TS packets it reproduces to the conditional data randomizer 19 as the input signal thereto. The conditional data randomizer 19 suppresses the sync bytes of the 188-byte TS packets and randomizes the remaining data in accordance with conventional 8-VSB practice, but only on condition that it is not within an M/H-service TS packet. The M/H-service TS packets bypass data randomization by the conditional data randomizer 19. The other remaining data are randomized per A/53, Annex D, §4.2.2. The conditional data randomizer 19 is connected for supplying the conditionally randomized data packets that it generates to an encoder 20 for preliminary systematic/non-systematic (207, 187) Reed-Solomon coding. The Reed-Solomon encoder 20 is as prescribed by A/153, Part 2, §5.3.2.9 "Systematic/Non-Systematic RS Encoder".

The RS parity generator polynomial and the primitive field generator for the RS encoder 20 are the same as those that A/53, Annex D, FIG. 23 prescribes for (207, 187) Reed-Solomon coding. The RS encoder 20 is connected for supplying the resulting segments of the data field generated therein as input signal to a convolutional byte interleaver 21. When the RS encoder 20 receives a main-service data packet, the RS encoder 20 performs the systematic RS coding process prescribed in A/53, Annex D, §4.2.3. The resulting twenty bytes of RS parity data are appended to the conclusion of the 187-byte packet in the main-service data packet subsequently supplied to the input port of the convolutional byte interleaver 21. When the RS encoder 20 receives an M/H-service data packet, the RS encoder 20 performs a non-systematic RS encoding process. The twenty bytes of RS parity data obtained from the non-systematic RS encoding process are inserted in various parity byte locations within each M/H-service TS packet subsequently supplied to the input port of the convolutional byte interleaver 21. These insertions correspond to what A/153 prescribes for M/H-service TS packets similarly located within an 8-VSB data field. The convolutional byte interleaver 21 is of the type specified in Section 5.3.2.10 "Convolutional Data Byte Interleaver" of Part 2 of A/153 or of a type equivalent in function. The byte-interleaver 21 response is supplied as a serial stream of 2-bit symbols, each composed of a respective X-sub-2 bit and a respective X-sub-1 bit.

The serial stream of 2-bit symbols from the convolutional byte interleaver 21 is applied as input signal to an X-sub-1 bits adjuster 22 that resets the 2/3 trellis coding used as inner convolutional coding of the each M/H Group at the beginning of each M/H Group. The X-sub-1 bits adjuster 22 also resets that 2/3 trellis coding at the conclusion of each M/H Group. The resetting of the 2/3 trellis coding at the conclusion of each M/H Group as well as its beginning allows for wrap-around decoding of the 2/3 trellis coding of each individual M/H Group. The response from the X-sub-1 bits adjuster 22 includes both M/H-service data segments and forwarded main-service data segments. This response is applied as input signal to a convolutional byte de-interleaver 23 of a type complementary to the convolutional byte interleaver 21. Still another encoder 24 for systematic/non-systematic (207, 187) Reed-Solomon codes per A/153, Part 2, §5.3.2.9 is connected to receive, as its input signal, the output signal from the byte de-interleaver 23. The Reed-Solomon encoder 24 recalculates the RS parity bytes in the M/H-service data segments affected by the X-sub-1 bits adjuster 22 resetting the 2/3 trellis coding at the beginning of each M/H Group and at the conclusion of each M/H Group. The RS encoder 24 response is supplied to the input port of a convolutional byte interleaver 25. The byte-interleaver 25 response is supplied as a serial stream of 2-bit symbols, each composed of a respective X-sub-2 bit and a respective X-sub-1 bit. The RS parity bytes from just two M/H-service data segments from each M/H Group need to be re-calculated to correct for X-sub-1 bits adjustment. So, the byte de-interleaver 23, the RS encoder 24 and the byte interleaver 25 can be replaced by simpler circuitry providing equivalent operation.

The serial stream of 2-bit symbols supplied as byte-interleaver 25 response is applied as input signal to a switched interference-filter pre-coder 26 for precoding all the X-sub-2 bits from the main-service (207, 187) RS codewords, the X-sub-2 bits from just the first two bytes of each MHE packet, and the X-sub-2 bits from the M/H-service (207, 187) RS codewords. The pre-coder 26 provides selective pre-coding of the X-sub-2 bits received as input signal, skipping over the X-sub-2 bits of the M/H-service data from the final 185 bytes of each MHE packets. If the Group formatter 15 inserts M/H training signals that have their X-sub-2 bits already pre-coded, the pre-coder 26 skips over pre-coding those X-sub-2 bits as well. If the Group formatter 15 inserts M/H training signals that do not have their X-sub-2 bits already pre-coded, the pre-coder 26 pre-codes those X-sub-2 bits. The pre-coder 26 response is applied as input signal to a post-comb filter 27 similar to those used in DTV receivers, and the post-comb filter 27 response is applied as input signal to a convolutional byte de-interleaver 28 of a type complementary to the convolutional byte interleaver 25. Another encoder 29 for systematic/non-systematic (207, 187) Reed-Solomon codes per A/153, Part 2, §5.3.2.9 is connected to receive, as its input signal, the output signal from the byte de-interleaver 28. The Reed-Solomon encoder 29 recalculates the parity bytes both in the main-service data segments and in the M/H-service data segments. Except for changes apt to be subsequently introduced into a few of the MHE packets during deterministic trellis-resetting, the response of the convolutional byte de-interleaver 28 resembles the data segments that a DTV receiver is expected to supply to its decoder of (207, 187) Reed-Solomon forward-error-correction coding.

A convolutional byte interleaver 30 is connected for receiving, as its input signal, the main-service and M/H-service data segments with re-calculated RS parity bytes from the RS encoder 29. The byte interleaver 30 is as specified by A/153, Part 2, §5.3.2.10 "Convolutional Data Byte Interleaver" or an equivalent thereof. The byte interleaver 30 is connected for supplying byte-interleaved 207-byte RS codewords to a parity replacer 31 that reproduces portions of those codewords in its response. This response is applied as input signal to a modified trellis encoder 32 of a type similar to that specified by A/153, Part 2, §5.3.2.11 "Modified Trellis Encoder" or an equivalent thereof. The modified trellis encoder 32 converts the byte-unit data from the parity replacer 31 to successive 2-bit symbols and performs a 12-phase trellis coding process on those symbols.

In order for the output signal from the trellis encoder 32 to include pre-defined known training data, initialization of the memories in the trellis encoder 32 is required, as described in A/153. This initialization is very likely to cause the RS parity data calculated by the RS encoder 29 prior to the trellis initialization to be erroneous. The RS parity data must be replaced to ensure backward compatibility with legacy DTV receivers. Accordingly, as described in A/153, Part 2, §5.3.2.11 "Modified Trellis Encoder", the switched trellis encoder 32 is connected for supplying the changed initialization bytes to an encoder 33 for non-systematic (207, 187) Reed-Solomon codes, as described in A/153, Part 2, §5.3.2.12 "Non-Systematic RS Encoder and Parity Replacer". The RS encoder 33 re-calculates the RS parity of the affected M/H packets. The RS encoder 33 is connected for supplying the re-calculated RS parity bytes to the RS parity replacer 31, which substitutes the re-calculated RS parity bytes for the original RS parity bytes before they can be supplied to the modified trellis encoder 32. That is, the RS parity replacer 31 reproduces the output of the byte interleaver 30 as regards the data bytes for each packet in its output signal, but reproduces the output of the non-systematic RS encoder 33 as regards the RS parity bytes for each packet in its output signal.

The modified trellis encoder 32 is connected for supplying its output signal to a read-only memory (ROM) 34 that responds to successive 3-bit input addresses to map them to respective ones of eight possible 8-VSB symbol levels. These 8-VSB symbol levels are supplied as the output signal from the M/H post-processor 5 and are applied as input signal to the sync multiplexer 6 shown in FIG. 1. The modified trellis encoder 32 differs from that described in A/153, Part 2, §5.3.2.11 in that a further trellis initialization is introduced in data segment 132 of each M/H Group. This further trellis initialization is used to introduce separation between a portion of a primary RS Frame and a portion of secondary RS Frame that appears in some M/H Groups.

Figure 3:
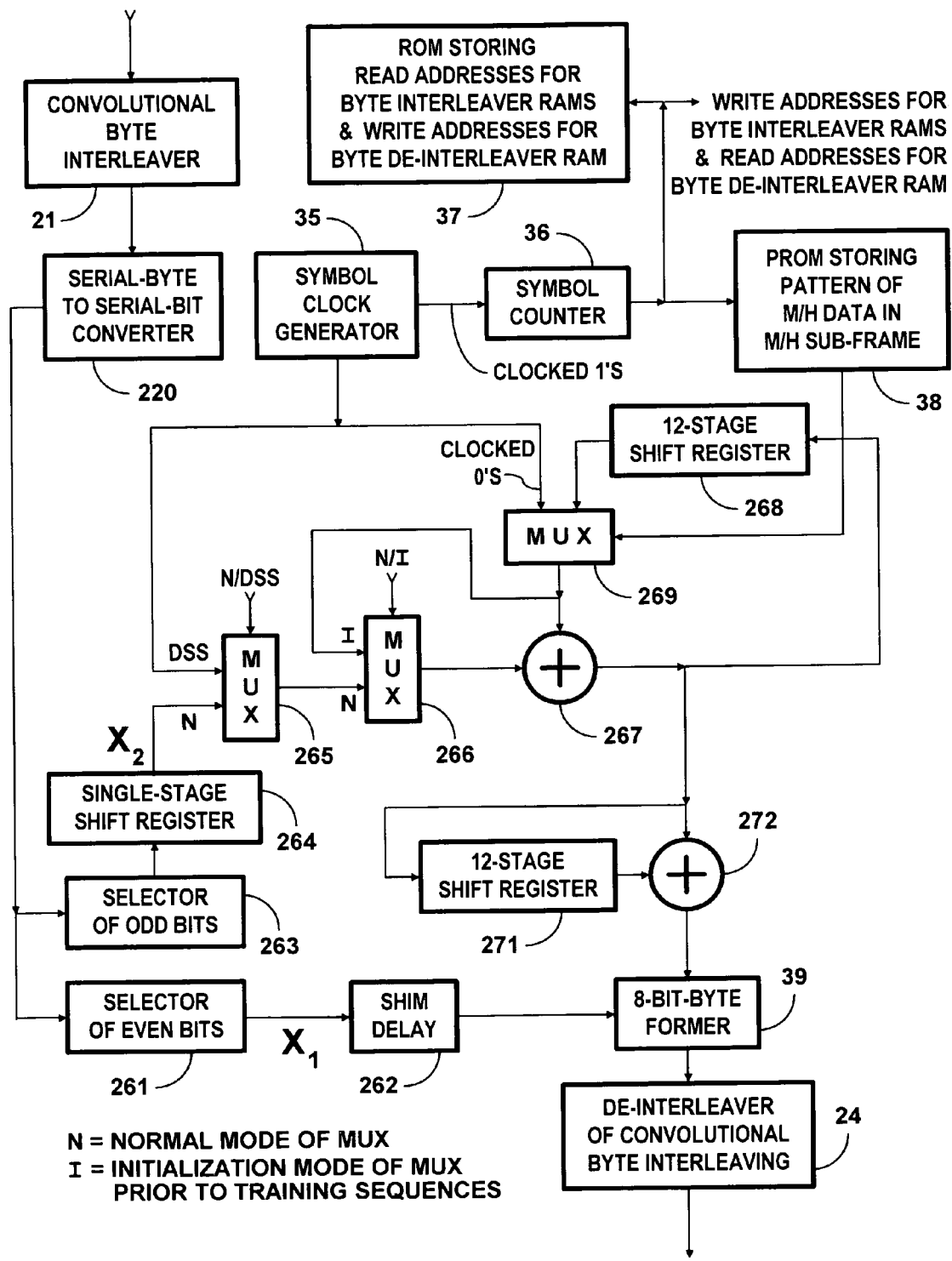
FIG. 3 is a schematic diagram showing in more detail the switched interference-filter pre-coder for only the X-sub-2 bits of main-service data and the post-comb filter that are preferably used in the FIG. 2 M/H post-processor.

FIG. 3 shows in more detail representative constructions of the switched interference-filter pre-coder 26 for only the X-sub-2 bits of main-service data and of the post-comb filter 27 cascaded thereafter. The pre-coder 26 comprises elements 260-269. The post-comb filter 27 comprises a 12-stage shift register 271 and a modulo-2 adder 272 (which is an exclusive-OR gate). A symbol clock generator 35 generates clocked ONEs and clocked ZEROes during 8-VSB data segments. The clocked ONEs are applied to a symbol counter 36 that counts the symbols in each M/H sub-Frame. This count is most convenient to use if made on a symbol-per-data-segment and data-segment-per-M/H-sub-Frame basis, since such count can be used with suitable delays as write addressing of respective random-access memories (RAMs) within the byte interleavers 21, 26 and 30. With suitable delay, such count can also be used as read addressing of random-access memory (RAM) within the byte de-interleavers 24 and 28. Portions of the count from the symbol counter 36 are applied as read addressing to a read-only memory 37 and as read addressing to a programmable read-only memory 38. With suitable delays, the response from the ROM 37 provides read addressing of the RAM within the byte de-interleavers 24 and 28. With suitable delays, the response from the ROM 37 provides write addressing of the respective RAMs within the byte interleavers 21, 26 and 30. With suitable delay, the response from the PROM 38 maps the pattern of M/H data symbols within each M/H sub-Frame to control the selective pre-coding of the X-sub-2 bits of main-service data by the interference-filter pre-coder 26. The programmability of the PROM 38 permits the broadcaster to change the number of M/H Groups per M/H sub-Frame.

More particularly, the PROM 38 stores a pattern of ONEs and ZEROes descriptive of the pattern of M/H-service and main-service 8-VSB symbols in an M/H sub-Frame. The pattern of ONEs and ZEROes descriptive of the pattern of M/H-service and main-service 8-VSB symbols in an M/H sub-Frame is read from the PROM 38 for controlling the operation of the pre-coder 26 in the M/H post processor 5 as shown in FIG. 2. Since the pattern changes only at boundaries between bytes, the size of the PROM 38 can be reduced if byte pattern information, rather than symbol pattern information, is stored therein. If the PROM 38 is reduced in size by storing byte pattern information, the two least significant bits of the symbol count from the symbol counter 35 are not included in the input addressing applied to the PROM 38.

The convolutional byte interleaver 21 is connected for applying successive eight-bit bytes of its response to the input port of a byte-to-bit converter 260 for conversion to serial-bit format at the input of the pre-coder 26. A selector 261 is connected for selectively reproducing just the even-occurring X-sub-1 bits from the serial-bit response of the byte-to-bit converter 260. These X-sub-1 bits are forwarded via shim delay 262 to an 8-bit byte former 39 to be bit-interleaved with processed X-sub-2 bits from the post-comb filter 27 as a preparatory step in forming 8-bit bytes for application to the byte de-interleaver 24. A selector 263 is connected for selectively reproducing just the odd-occurring X-sub-2 bits from the serial-bit response of the byte-to-bit converter 261. The selector 263 is connected for applying the reproduced X-sub-2 bits to the input port of a single-stage shift register 264. The output port of the shift register 264 is connected for applying the reproduced X-sub-2 bits to a first of two input ports of a multiplexer 265, which port is labeled 'N' in FIG. 3. The single-stage shift register 264 delays X-sub-2 bits selected from the serial-bit response of the byte-to-bit converter 260 for better aligning them temporally with X-sub-1 bits selected from that serial-bit response. A second of the two input ports of the multiplexer 265, which port is labeled 'DSS' in FIG. 3, is connected for receiving clocked ZEROes generated by the symbol clock generator 35. The multiplexer 265 is conditioned by a control signal (labeled N/DSS in FIG. 3) to reproduce at an output port thereof two selected ones of these clocked ZEROes during each data segment synchronization (DSS) interval. At times other than DSS intervals the multiplexer 265 is conditioned by its control signal to reproduce at its output port the X-sub-2 bits supplied to its first input port. The output port of the multiplexer 265 is connected to a first of two input ports of a multiplexer 266, which input port is labeled 'N' in FIG. 3. During normal operation the multiplexer 266 is conditioned by a normal/initialize (N/I) control signal to reproduce at its output port the multiplexer 265 response. The output port of the multiplexer 266 is connected for applying a first of two summand input signals applied to a modulo-2 adder 267 (which is an exclusive-OR gate). The modulo-2 adder 267 is connected for applying a serial-bit sum output signal therefrom to the post-comb filter 27.

The modulo-2 adder 267 is also connected for applying its serial-bit sum output signal to the input port of a 12-stage shift register 268. The output port of the 12-stage shift register 268 is connected to one of two input ports of a multiplexer 269, the output port of which is connected for supplying a second of the two summand input signals applied to the modulo-2 adder 267. The other input port of the multiplexer 269 is connected for receiving ZERO bits clocked at symbol rate from the symbol clock generator 35. When the multiplexer 269 receives a control signal conditioning it to reproduce the serial-bit sum output signal of the adder 267 as delayed by the 12-stage shift register 268, the bits supplied to the post-comb filter 27 are pre-coded. When the multiplexer 269 receives a control signal conditioning it to reproduce the clocked ZEROes supplied from the symbol clock generator 35, the bits supplied to the post-comb filter 27 are not pre-coded. Rather, they are identical to the X-sub-2 bits supplied from the output port of the multiplexer 269.

FIG. 3 shows the modulo-2 adder 267 connected for applying the selectively pre-coded X-sub-2 bits of its serial-bit sum output signal to the input port of a 12-stage shift register 271 in the post-comb filter 27. The output port of the 12-stage shift register 268 is connected for supplying delayed response to the adder 267 sum output signal as one of the two summand input signals of the modulo-2 adder 272 in the post-comb filter 27. The adder 267 is connected for applying its sum output signal to the modulo-2 adder 272 as the second of the two summand input signals thereof. The adder 272 is connected for applying the selectively post-comb-filtered X-sub-2 bits of its serial-bit sum output signal to the 8-bit byte former 39 to be bit-interleaved with X-sub-1 bits forwarded via shim delay 263. The byte former 39 forms 8-bit bytes from the results of this bit-interleaving, which bytes are supplied to the byte de-interleaver 24 as input signal thereto.

The shift registers 268 and 271 are continuously clocked at symbol epoch rate throughout data fields, even during the data-segment synchronization (DSS) intervals. The FIG. 3 arrangement can be modified to omit the shift register 271. The response of the 12-stage shift register 268 is then applied as the first summand input signal of the modulo-2 adder 272 instead of the response of the 12-stage shift register 271 being so applied. One skilled in the art of designing electronics will recognize that the 12-phase trellis coding procedures can be carried out using commutated operation of twelve single-phase encoders, rather than by a single 12-phase encoder as depicted in FIG. 3. Such equivalent circuitry is more similar to the trellis encoders described in A/53.

Figure 4:
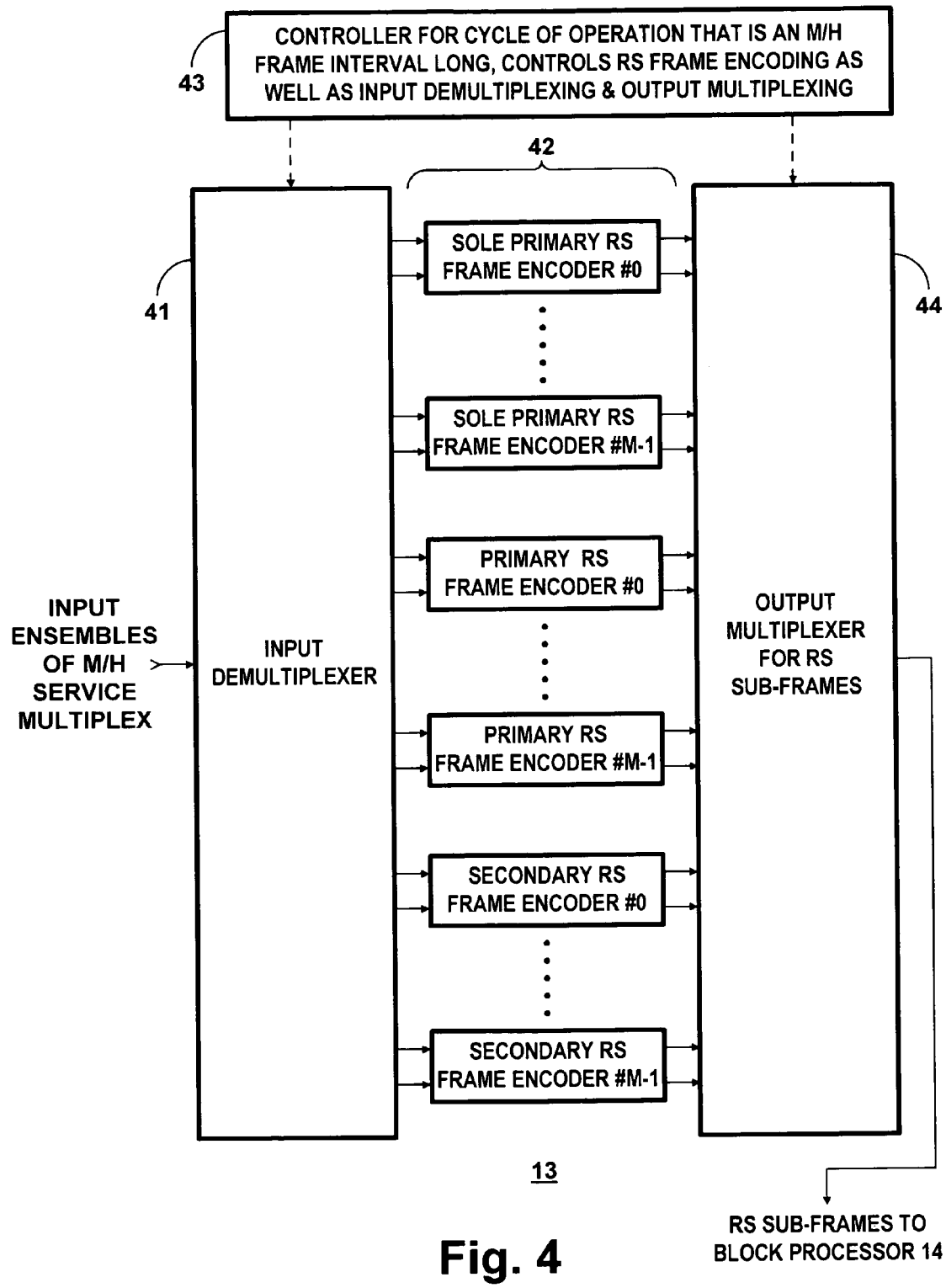
FIG. 4 is a schematic diagram of a representative embodiment of the M/H Frame encoder in the FIG. 1 DTV transmitter apparatus.

FIG. 4 shows the M/H Frame encoder 13 of the FIG. 1 DTV transmitter apparatus in some detail. The FIG. 4 M/H Frame encoder 13 comprises elements similar to those in prior-art M/H Frame encoders. The Ensembles of M/H Service Multiplex data are applied as input signals to an input de-multiplexer 41. The input de-multiplexer 41 is further connected for distributing those M/H Ensembles to a set 42 of RS Frame encoders as their respective input signals. A number M up to sixteen of RS Frame encoders in the set 42 can be used for encoding a sole primary RS Frame that is unaccompanied by a secondary RS Frame. A number M up to sixteen of further RS Frame encoders in the set 42 can be used for encoding a primary RS Frame that is accompanied by a secondary RS Frame. A number M up to sixteen of still further RS Frame encoders in the set 42 can be used for encoding a secondary RS Frame that accompanies a primary RS Frame. The distribution of the M/H Ensembles to the set 42 of RS Frame encoders is controlled by a control signal that a controller 43 generates and supplies to the input de-multiplexer 41. An output multiplexer 44 for RS Sub-Frames is connected for time-division multiplexing Sub-Frame responses from the set 42 of RS Frame encoders for application to the block processor 14. This time-division multiplexing is controlled by a control signal the controller 43 generates and supplies to the output multiplexer 44.

Figure 5:
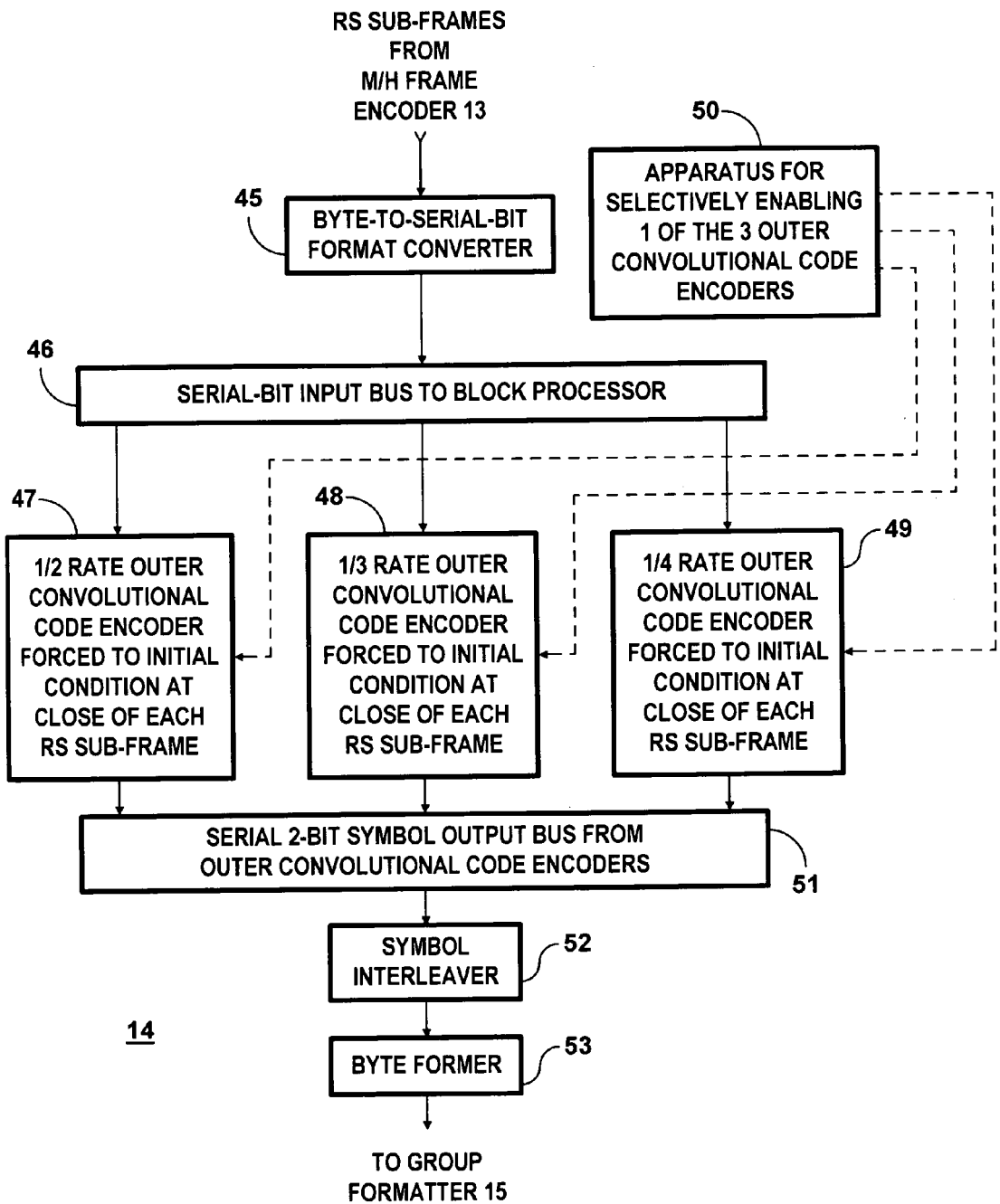
FIG. 5 is a schematic diagram of a representative embodiment of the block processor employed in the FIG. 1 DTV transmitter apparatus, which block processor provides outer convolutional coding of M/H data at any one of 1/2, 1/3 and 1/4 code rates.

FIG. 5 shows in more detail a preferred embodiment of the block processor 14 in the FIG. 1 DTV transmitter apparatus. The M/H Frame encoder 13 is connected for supplying subframes of RS Frames in 8-bit byte format as input signal to a byte-to-serial-bit format converter 45. The format converter 45 is connected for supplying the M/H Frame encoder 13 response as converted to serial-bit format to a serial-bit input bus 46 of the block processor 14. The input bus 46 is connected to convey the M/H Frame encoder 13 response as converted to serial-bit format to encoders 47, 48 and 49 as their respective input signals. The encoders 47, 48 and 49 shown in FIG. 5 generate one-half-rate outer convolutional coding, one-third-rate outer convolutional coding and one-quarter outer convolutional coding, respectively. FIG. 5 shows apparatus 50 for selectively enabling operation of the encoders 47, 48 and 49 one at a time. If the encoders 47, 48 and 49 have separate physical structures, the apparatus 50 for selectively enabling operation can by way of example be such as to supply operating power to only a selected one of the three encoders. In actual practice the encoders 47, 48 and 49 will probably use elements in common. In such case the apparatus 50 will comprise selective connection circuitry for selecting the outer convolutional coding with desired rate. FIG. 5 shows the encoders 47, 48 and 49 connected for supplying serial 2-bit symbols to an output bus 51 for subsequent application to a symbol interleaver 52. The response from the symbol interleaver 52 is supplied to a byte former 53, which converts the symbol interleaver response into 8-bit bytes to be supplied to the Group formatter 15 as an input signal thereto.

Figure 6:
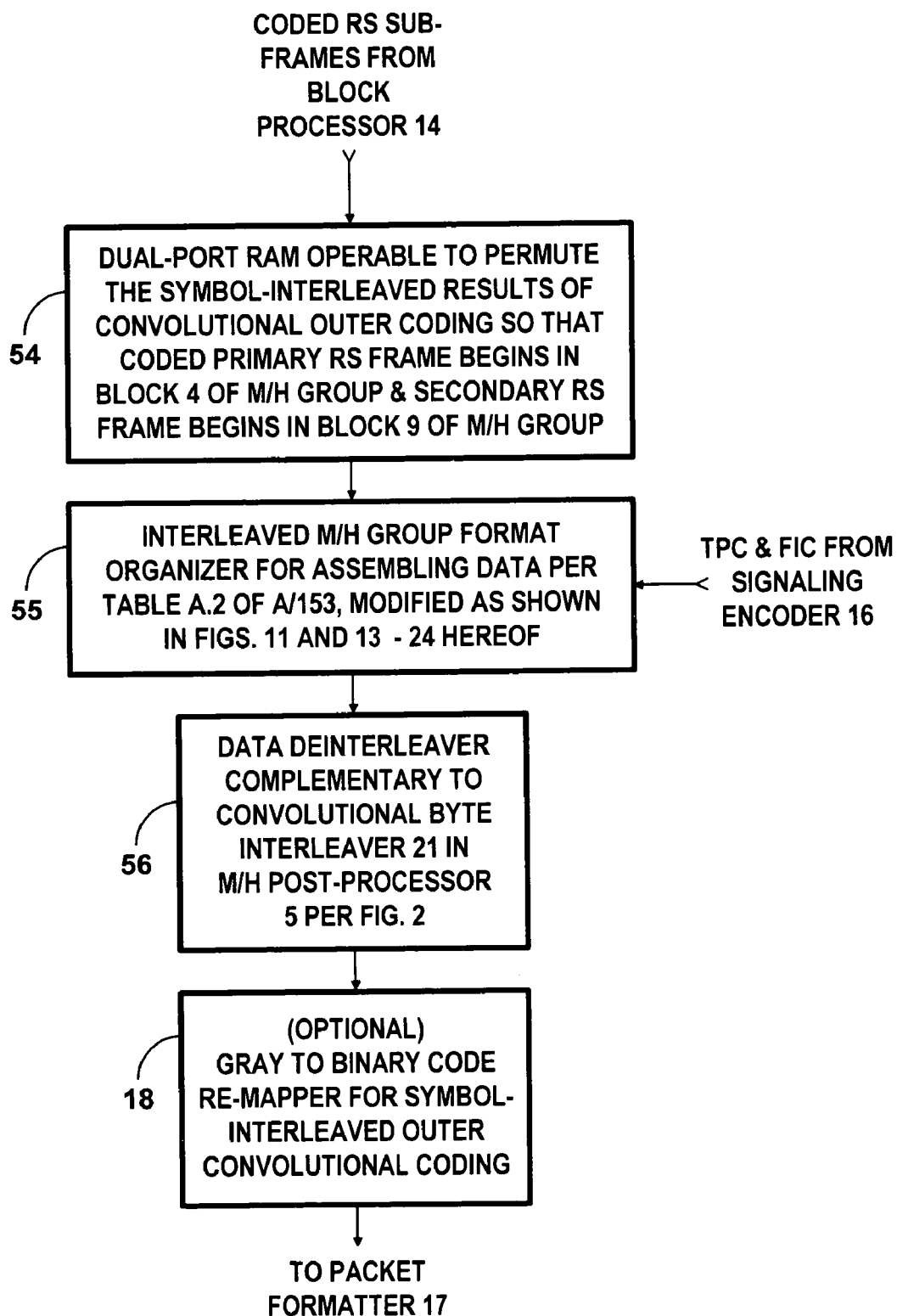
FIG. 6 is a schematic diagram of the M/H Group processor employed in the FIG. 1 DTV transmitter apparatus, which M/H Group processor in accordance with an aspect of the invention includes random-access memory operable to permute the positioning of RS Frames within M/H Groups.

FIG. 6 shows the M/H Group formatter 15 in more detail. In accordance with an aspect of the invention, these bytes are written to a dual-port random-access memory 54 within the Group formatter 15. Preferably, but not necessarily, the RAM 54 is operated for permuting the time order of symbol-interleaved results of outer convolutional coding written to the RAM 54 when subsequently reading from the RAM 24 to supply input signal to an interleaved M/H Group format organizer 55 included within the Group formatter 15. The permutation is such that the coded portion of the primary RS Frame of each M/H Group will begin after the sequence of TPC and FIC signaling, the trellis-initialization immediately following and the subsequent training sequence of known 8VSB symbols in Block 4 of that M/H Group. The training sequence returns 2/3 trellis coding conditions at its conclusion to the same trellis coding conditions that the preceding trellis-initialization establishes at the beginning of the training sequence. If the coded portion of the primary RS Frame is not accompanied by a coded portion of a secondary RS Frame within the same M/H Group, the coded portion of the primary RS Frame will conclude just before the sequence of TPC and FIC signaling in Block 3 of that M/H Group. If the coded portion of the primary RS Frame is accompanied by a portion of a secondary RS Frame within the same M/H Group, the coded portion of the primary RS Frame will conclude within Block 8 of that M/H Group. The coded portion of the secondary RS Frame will begin thereafter within Block 8 of that M/H Group. Then, following Block 10 of the M/H Group, the coded portion of the secondary RS Frame will loop back to the beginning of the M/H Group and concludes just before the sequence of TPC and FIC signaling in Block 3 of that M/H Group.

Alternatively, the RAM 54 is operated for preserving the normal time order of the symbol-interleaved results of outer convolutional coding as written to the RAM 54 when subsequently reading from the RAM 24 to supply input signal to the interleaved M/H Group format organizer 55. An M/H Group customarily encodes only a portion of a primary RS Frame when the RAM 54 is so operated. The coded portion of the primary RS Frame will begin close to the beginning of the M/H Group. The coded portion of the primary RS Frame will stop before just before the sequence of TPC and FIC signaling in Block 3 of the M/H Group and then resume immediately after the first training sequence in that M/H Group to conclude close to the conclusion of that M/H Group.

The interleaved Group format organizer is generally similar to that described in A/153, operating on the Group format as it will appear after the ATSC data interleaver. The interleaved Group format organizer maps the FEC coded M/H-service data from the block processor into the corresponding M/H blocks of a Group, adding pre-determined training data bytes and place-holder bytes that will later be replaced by trellis-initialization bytes. The interleaved Group format organizer also inserts 3-byte headers for the MHE packets. The interleaved Group format organizer also inserts place-holder bytes for main-service data and for non-systematic RS parity. The interleaved Group format organizer supplies the resulting interleaved M/H Group to a byte de-interleaver that complements the ATSC convolutional byte interleaver. This byte de-interleaver is included within the Group formatter 15. The Group formatter 15 is connected for supplying the response of this de-interleaver as its output signal. The output signal of the Group formatter 15 is supplied directly to the packet formatter 17 as input signal thereto, if the optional Gray-to-binary-code re-mapper 18 is not used. If the re-mapper 18 is used, the output signal of the Group formatter 15 is applied to the re-mapper 18 as input signal thereto, and the response of the re-mapper 18 is applied as input signal to the packet formatter 17. Initially, the packet formatter 17 expunges the main-service data place holders and the RS parity place holders that were inserted by the interleaved Group format organizer for proper operation of the byte de-interleaver in the Group formatter 15. The packet formatter 17 inserts an MPEG TS sync byte before each 187-byte data packet as a prefix thereof, thereby generating a respective MHE packet supplied to the packet multiplexer 3 for time-division multiplexing with the main-service TS packets.

In FIGS. 7, 8 and 9 each stack of three blocks shows the four 3-bit symbols resulting from a byte of data presented to the modified trellis encoder 32 shown in FIG. 2. The Z-sub-2 bits are shown in the uppermost blocks in the stacks. The Z-sub-1 bits are shown in the middle blocks in the stacks. The Z-sub-2 bits are shown in the lowermost blocks in the stacks. The Z-sub-2 bits of main-service symbols are shown as A's where their values are indeterminate. The Z-sub-1 bits of main-service symbols are shown as B's where their values are indeterminate. The Z-sub-0 bits of main-service symbols are shown as C's where their values are indeterminate. The Z-sub-2 bits of M/H-service symbols are shown as F's where their values are indeterminate. The Z-sub-1 bits of M/H-service symbols are shown as G's where their values are indeterminate. The Z-sub-0 bits of M/H-service symbols are shown as H's where their values are indeterminate.

FIG. 7 depicts an ideal transition when beginning an M/H Group. The Z-sub-1 bits from the 24 symbols just before the start of the M/H Group are related to preceding Z-sub-0 bits so that the modified trellis encoder 32 produces Z-sub-0 bits in the final twelve main-service symbols and the initial twelve M/H-service symbols that are all ZEROes. The symbols in the M/H Group are those that would be generated by the modified trellis encoder 32 if its registers for Z-sub-0 bits were filled just with ZEROes at the transition to the M/H Group.

FIG. 8 depicts an ideal transition when concluding an M/H Group. The Z-sub-1 bits from the 24 symbols just before the start of the M/H Group are related to preceding Z-sub-0 bits so that the modified trellis encoder 32 produces Z-sub-0 bits in the final twelve M/H-service symbols and the initial twelve main-service symbols that are all ZEROes. The main-service symbols in the M/H Group are those that would be generated by the modified trellis encoder 32 if its registers for Z-sub-0 bits were filled just with ZEROes at the transition from the M/H Group.

FIG. 9 depicts the wrap-around of the trellis coding of Z-sub-1 and Z-sub-0 bits in each M/H Group as read from memory in an M/H receiver to its turbo decoder. The registers for Z-sub-0 bits in the modified trellis encoder 32 are filled just with ZEROes at transitions both to and from each M/H Group. So, after the transition from the conclusion of the M/H Group, turbo decoding can continue with symbols from the beginning of the M/H Group rather than continuing with symbols succeeding the M/H Group. There will be no disruption in decoding-owing to such wrap-around. Next, the procedures for forcing the trellis coding conditions depicted in FIGS. 7 and 8 will be considered.

FIG. 10 is a legend describing the types of bytes incorporated in the data segments of 8VSB transmissions of M/H data diagrammed in FIGS. 11 through 24. FIGS. 11 through 24 show modifications of selected ones of the segments of interleaved 8VSB data in an M/H group that Appendix A.2 of A/153, Part 2 shows. Arrows indicate the bytes in these data segments of the M/H Group that either are modified or are associated with opening or closing sequences for inner convolutional coding.

FIGS. 11 and 12 diagram the byte contents of data segments 6 and 7 of the modified M/H Group. Data segment 6 is modified to replace the five final dummy bytes and the subsequent single M/H data byte with bytes that force a prescribed initial condition for inner convolutional code at an opening point in data segment 6. These replacement bytes provide trellis-initialization for the inner convolutional coding provided by the 2/3 trellis coding of all 8VSB symbols. At the time this specification was written, the preferred location of the opening point in data segment 6 was just before the final three M/H data bytes therein. The six underlined bytes in data segment 6 are those in which Z-sub-zero bits in the 2/3 trellis coders and decoders are reset to initial ZERO states. These six underlined bytes are referred to as "target bytes", and the four 2-bit-symbol epochs in each "target" byte are referred to as "target symbol epochs". The "target bytes" were kept in the same data segment as the trellis-reset bytes used to force the Z-sub-0 bits of 8-VSB symbols in those "target bytes" to be ZEROes. This was done as a matter of convenience, to avoid having to take into account the effects of the data segment synchronization sequences when predicting the values of the Z-sub-0 bits of 8-VSB symbols in "target bytes".

FIG. 13 diagrams the byte contents of data segment 162 of the M/H Group, as modified to replace the final three sequences of two M/H data bytes therein with bytes that force a prescribed final condition for inner convolutional code at a closing point within the data segment 162. FIG. 13 shows the closing point in data segment 162 to be six bytes after the last of the bytes that force a prescribed final condition for inner convolutional code. This prescribed final condition for inner convolutional code at the closing point in data segment 162 is the same as the prescribed initial condition for inner convolutional code at the opening point in data segment 7. This permits wrap-around of the inner convolutional coding within an M/H Group, allowing reduction in the amount of memory that an M/H receiver requires in the decoder for inner convolutional code used in turbo decoding. The underlined bytes in data segment 162 are those in which the Z-sub-zero bits in the 2/3 trellis coders and decoders are reset to final ZERO states. These six underlined bytes are also referred to as "target bytes", and the four 2-bit-symbol epochs in them are also referred to as "target symbol epochs".

FIGS. 14, 15 and 16 show data segments 39, 91 and 143 of the M/H Group modified so as to replace the third bytes of the headers of M/H-encapsulating packets with M/H data bytes. FIG. 17 shows data segment 132 of the M/H Group modified to include deterministic trellis initialization to separate and define new primary and secondary RS Frames, as well as to replace dummy bytes with M/H data bytes. FIGS. 18 through 23 show data segments 148, 21, 37, 67, 83 and 99 of the M/H Group modified so as to replace dummy bytes with M/H data bytes. FIG. 24 shows data segment 163 of the M/H Group modified to replace outlying M/H data bytes with dummy bytes.

FIGS. 25A and 25B can be combined to form FIG. 25, a schematic diagram showing in greater detail the X-sub-1 bits adjuster 22 in the M/H post-processor shown in FIG. 2. In accordance with a principal aspect of the invention the X-sub-1 bits adjuster 22 adjusts the X-sub-1 bitstream such that the modified trellis encoder 32 will subsequently initialize the trellis coding of Z-sub-1 and Z-sub-0 bits at the beginning and conclusion of each M/H Group. The X-sub-1 bitstream supplied from the convolutional byte interleaver 21 is applied to the input port of an encoder 230 for the 12-phase trellis code used as the inner convolutional code of the CCC used in M/H transmissions. The X-sub-2 bitstream supplied from the convolutional byte interleaver 21 is applied to the input port of a digital delay line 220 depicted in FIG. 25B. The X-sub-2 bits serially supplied in the response from the output port of the digital delay line 220 are delayed so as to compensate for the delay of X-sub-1 bits in a tapped digital delay line comprising cascaded elements 221, 222, 223, 224, 225 and 226. The output port of the digital delay line 220 is connected for supplying the delayed X-sub-2 bits to the convolutional byte de-interleaver 23 that succeeds the X-sub-1 bits adjuster 22.

More particularly, with reference to FIG. 25A, the X-sub-1 bitstream supplied from the convolutional byte interleaver 21 is applied to the input port of a 72-stage shift register 221, the output port of which connects to a first summand input port of a modulo-2 adder 222. The output port of the modulo-2 adder 222 connects to the input port of a 216-stage shift register 223, the output port of which connects to a first summand input port of a modulo-2 adder 224. The output port of the modulo-2 adder 224 connects to the input port of a 288-stage shift register 225, the output port of which connects to a first summand input port of a modulo-2 adder 226 depicted in FIG. 25B. The output port of the modulo-2 adder 226 is connected for supplying the convolutional byte de-interleaver 23 that succeeds the X-sub-1 bits adjuster 22 with a delayed X-sub-1 bitstream composed of adjusted X-sub-1 bits.

A 2-input AND gate 227 has its output port connected to the second summand input port of the modulo-2 adder 222. A 2-input AND gate 228 has its output port connected to the second summand input port of the modulo-2 adder 224. A 2-input AND gate 229 has its output port connected to the second summand input port of the modulo-2 adder 226.

The encoder 230 for the 12-phase trellis code used as the inner convolutional code of the CCC used in M/H transmissions generates Z-sub-0 bits that predict the Z-sub-0 bits that would be generated by a similar encoder for the 12-phase trellis code located after the X-sub-1 bits adjuster 22. This prediction is based on the assumption that X-sub-1 bits are not adjusted within the tapped digital delay line comprising cascaded elements 221, 222, 223, 224, 225 and 226. Suppose the encoder 230 predicts that a future X-sub-1 bit issuing from the output port of the modulo-2 adder 226 will cause a subsequent encoder to generate an X-sub-0 bit that would be a ONE, rather than a desired ZERO. Then, an X-sub-1 bit that will issue earlier from the output port of the modulo-2 adder 226 is complemented at a suitable point in the tapped digital delay line. This results in the next X-sub-0 bit and every twenty-fourth X-sub-0 bit thereafter to be complemented, until the next trellis initialization is performed. Complementing an earlier bit a multiple of 24 bits before the target X-sub-1 bit will cause the later encoder to generate an X-sub-0 bit that will be the desired ZERO, rather than a ONE. Essentially, the designer is faced with a 24-phase filtering problem with regard to plural-level digital symbols.

The encoder 230 is connected for applying the Z-sub-0 bits that it generates to respective first input ports of the 2-input AND gates 227, 228 and 229. Respective second input ports of the 2-input AND gates 227, 228 and 229 are connected for receiving respective control signals that condition them for selectively reproducing the Z-sub-0 bits that the encoder 230 generates. A counter 36 is connected for counting symbol epochs. E.g., the count input to the counter 36 can be clock pulses supplied from the symbol clock generator 35.

Referring back to FIG. 11, the ninth through sixteenth target symbols in the initial target byte of data segment 6 are in the same ones of the twenty-four symbol phases as the reset symbols 72 symbol epochs earlier. A decoder 231 supplies a logic ONE output signal responsive to the count of symbol epochs supplied from the counter 36 to signal when the ninth through sixteenth target symbols occur in the initial target byte of data segment 6 of an M/H Group. At all other times the decoder 231 supplies a logic ZERO output signal.

Referring back to FIG. 12, the ninth through sixteenth target symbols in the final target byte of data segment 162 are in the same ones of the twenty-four symbol phases as the reset symbols 72 symbol epochs earlier. A decoder 232 supplies a logic ONE output signal responsive to the count of symbol epochs supplied from the counter 36 to signal when the ninth through sixteenth target symbols occur in the final target byte of data segment 162 of an M/H Group. At all other times the decoder 232 supplies a logic ZERO output signal.

A 2-input OR gate 233 is connected for receiving the output signals from the decoders 231 and 232 at respective ones of its input ports. The OR gate 233 supplies a logic ONE at its output port responsive to either one of the output signals from the decoders 231 and 232 being a logic ONE. At all other times the OR gate 233 supplies a logic ZERO output signal at its output port. The output port of the OR gate 233 connects to the second input port of the AND gate 227 for supplying control signal thereto. When one of the output signals from the decoders 231 and 232 is a logic ONE during the ninth through sixteenth target symbols in a target byte, the OR gate 233 supplies a logic ONE control signal to the second input port of the AND gate 227. This logic ONE conditions the AND gate 227 to reproduce at its output port the X-sub-1 bits supplied to its first input port from the encoder 230 for 12-phase trellis code after the 72-symbol-epochs delay caused by the 72-stage shift register 221. The modulo-2 adder 222 functions as an exclusive-OR gate, responding to the delayed reset symbols received at its first summand input port to supply their bit complements from its sum output port when those delayed reset symbols differ from the reproduced Z-sub-0 bits received at its second summand input port.

Referring back to FIG. 11 again, the seventeenth through twenty-fourth target symbols in the initial target byte of data segment 6 are in the same ones of the twenty-four symbol phases as the reset symbols 288 symbol epochs earlier. A decoder 234 supplies a logic ONE output signal responsive to the count of symbol epochs supplied from the counter 36 to signal when the seventeenth through twenty-fourth target symbols occur in the initial target byte of data segment 6 of an M/H Group. At all other times the decoder 234 supplies a logic ZERO output signal.

Referring back to FIG. 12 again, the seventeenth through twenty-fourth target symbols in the final target byte of data segment 162 are in the same ones of the twenty-four symbol phases as the reset symbols 288 symbol epochs earlier. A decoder 235 supplies a logic ONE output signal responsive to the count of symbol epochs supplied from the counter 36 to signal when the seventeenth through twenty-fourth target symbols occur in the final target byte of data segment 162 of an M/H Group. At all other times the decoder 232 supplies a logic ZERO output signal.

A 2-input OR gate 236 is connected for receiving the output signals from the decoders 234 and 235 at respective ones of its input ports. The OR gate 236 supplies a logic ONE at its output port responsive to either one of the output signals from the decoders 234 and 235 being a logic ONE. At all other times the OR gate 236 supplies a logic ZERO output signal at its output port. The output port of the OR gate 233 connects to the second input port of the AND gate 228 for supplying control signal thereto. When one of the output signals from the decoders 234 and 235 is a logic ONE during the seventeenth through twenty-fourth target symbols in a target byte, the OR gate 236 supplies a logic ONE control signal to the second input port of the AND gate 228. This logic ONE conditions the AND gate 229 to reproduce at its output port the X-sub-1 bits supplied to its first input port from the encoder 230 for 12-phase trellis code. These bits are supplied after the 288-symbol-epoch cumulative delay caused by the 72-stage shift register 221 and the 216-stage shift register 223. The modulo-2 adder 226 functions as an exclusive-OR gate, responding to the reset symbols received at its first summand input port to supply their bit complements from its sum output port when those reset symbols differ from the reproduced X-sub-1 bits received at its second summand input port.

Referring back to FIG. 11 still again, the first through eighth target symbols in the initial target byte of data segment 6 are in the same ones of the twenty-four symbol phases as the reset symbols 576 symbol epochs earlier. A decoder 237 supplies a logic ONE output signal responsive to the count of symbol epochs supplied from the counter 36 to signal when the first through eighth target symbols occur in the initial target byte of data segment 6 of an M/H Group. At all other times the decoder 237 supplies a logic ZERO output signal.

Referring back to FIG. 12 still again, the first through eighth target symbols in the final target byte of data segment 162 are in the same ones of the twenty-four symbol phases as the reset symbols 576 symbol epochs earlier. A decoder 238 supplies a logic ONE output signal responsive to the count of symbol epochs supplied from the counter 36 to signal when the first through eighth target symbols occur in the final target byte of data segment 162 of an M/H Group. At all other times the decoder 238 supplies a logic ZERO output signal.

A 2-input OR gate 239 is connected for receiving the output signals from the decoders 237 and 238 at respective ones of its input ports. The OR gate 239 supplies a logic ONE at its output port responsive to either one of the output signals from the decoders 237 and 238 being a logic ONE. At all other times the OR gate 239 supplies a logic ZERO output signal at its output port. The output port of the OR gate 239 connects to the second input port of the AND gate 229 for supplying control signal thereto. When one of the output signals from the decoders 237 and 238 is a logic ONE during the ninth through sixteenth target symbols in a target byte, the OR gate 239 supplies a logic ONE control signal to the second input port of the AND gate 229. This logic ONE conditions the AND gate 229 to reproduce at its output port the X-sub-1 bits supplied to its first input port from the encoder 230 for 12-phase trellis code. These bits are supplied after the 576-symbol-epoch cumulative delay caused by the 72-stage shift register 221, the 216-stage shift register 223 and the 288-stage shift register 225. The modulo-2 adder 226 functions as an exclusive-OR gate, responding to the reset symbols received at its first summand input port to supply their bit complements from its sum output port when those reset symbols differ from the reproduced X-sub-1 bits received at its second summand input port.

The three alternative transverse Reed-Solomon (TRS) codes specified by A/153 each have 187 data bytes in their codewords, but differ with regard to the number of parity bytes their codewords respectively have. This presumably was done to accommodate fields of 187-byte MPEG-2-compliant transport-stream (TS) packets being recovered from RS Framestores after turbo decoding. ATSC decided to use an internet-protocol (IP) transport stream, however, rather than the MPEG-2-compliant one. The fact that TRS codes have 187 data bytes in their codewords is no longer particularly significant, since the lengths of the TS packets in IP vary up to a specified maximum length of 2952 bytes. There is a basic flaw in the design of the three proposed transverse Reed-Solomon (TRS) codes of different strength—namely, that the three strengths of TRS coding do not pack in the same way into a Group because they are not of uniform length. Packing can be optimized for one strength of TRS coding, but almost certainly cannot be optimized for the other two strengths of TRS coding. Some portion of possible payload may be lost to stuffing bytes with these other two strengths of TRS coding. A way to avoid this problem in part is to use a few TRS codewords that are shortened more than the others, but this fix is inconvenient to put into practice, since there are variations of the fix depending on number of Groups (NoG) in an RS Frame.

The TRS codes for 8-bit bytes are usually shortened 255-byte RS codes. Various TRS codes for 8-bit bytes may be of a uniform overall length, possibly shortened, but have different strengths depending on the respective ratio of the number of parity bytes to data bytes in each of these codes. Computation of the TRS codeword lengths that best fill each M/H Group are based on the following numbers of M/H data bytes in each of the 10 Blocks in the M/H Group.

| | |
|---|---|
| Block 1 | 528 bytes |
| Block 2 | 1536 bytes |
| Block 3 | 2416 bytes |
| Block 4 | 2391 bytes |
| Block 5 | 2772 bytes |
| Block 6 | 2524 bytes |
| Block 7 | 2772 bytes |
| Block 8 | 2496 bytes |
| Block 9 | 1442 bytes |
| Block 10 | 478 bytes |

The third bytes of MHE packets are used as M/H data bytes and are included in the counts of M/H data bytes. There is, then, a total of 19,355 M/H data bytes in each M/H Group before any of these bytes is appropriated for resetting 2/3 trellis coding at both the beginning and the conclusion of that M/H Group.

Figure 26:
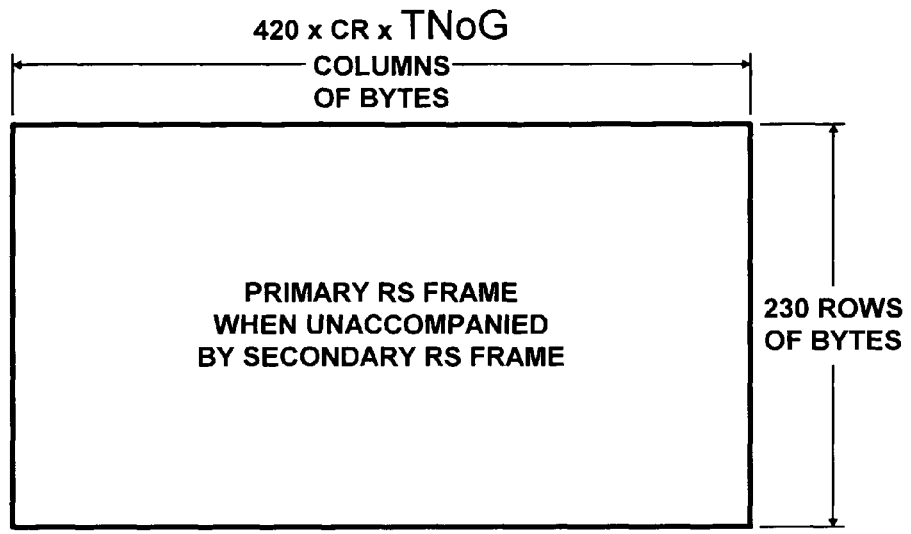
FIG. 26 is a depiction of a novel primary RS Frame format preferred in a component RS Frame encoder in the FIG. 4 M/H frame encoder when there is no accompanying secondary RS Frame.

FIG. 26 shows the preferred size and proportions of a sole primary RS Frame that is unaccompanied by a secondary RS Frame. The number of coded bytes respectively associated with each M/H Group is preferably a multiple of twelve. Then, that an integral number of bytes of one-quarter-rate, one-third-rate and one-half-rate outer convolutional codes will fit within the M/H Group, with no bytes being split between two MAI Groups. It is desirable to pack the byte epochs available for data in the M/H Groups as fully as possible and to minimize the number of those byte epochs left over which will be filled with "stuffing" bytes. The number of columns of bytes in an RS Frame is accordingly preferably a multiple of NoG, the number of M/H Groups in the M/H Parade that will fill that RS Frame. Up to 19,355 bytes of coded primary RS Frame can be accommodated within each M/H Group, supposing that none of the dummy bytes specified in A/153, Part 2, Annex A is replaced by a respective M/H data byte. One-sixth-rate, one-fifth-rate, one-quarter-rate, one-third-rate and one-half-rate outer convolutional codes fit evenly within a 19,320-byte portion of an M/H Group, since 19,320 is a multiple of sixty.

It is desirable to use an R-S codeword length such that an integral number of R-S codewords as subjected to outer convolutional coding can be fitted into each M/H Group. Forty-six 210-byte shortened R-S codes with one-half-rate outer convolutional coding take up 19,320 bytes. Twenty-three 210-byte shortened R-S codes with one-quarter-rate outer convolutional coding take up 19,320 bytes. However, an integral number of 210-byte shortened R-S codes with one-third-rate outer convolutional coding does not fit evenly into an M/H Group nor into five M/H Groups. Forty-two 230-byte shortened R-S codes with one-half-rate outer convolutional coding take up 19,320 bytes. Twenty-eight 230-byte shortened R-S codes with one-third-rate outer convolutional coding take up 19,320 bytes. Twenty-one 230-byte shortened R-S codes with one-quarter-rate outer convolutional coding take up 19,320 bytes. Accordingly, FIG. 22 shows the sole primary RS Frame that is unaccompanied by a secondary RS Frame to have 230 rows of 8-bit bytes. The number of 8-bit bytes in each row is 420 times NoG times the code rate CR of the outer convolutional coding. The fact that the number of columns of 8-bit bytes in the sole primary RS Frame is a multiple of three makes it possible to split the sole primary RS Frame into a primary RS Frame and a secondary RS Frame half the size of the primary RS Frame.

Figures 27, 28:
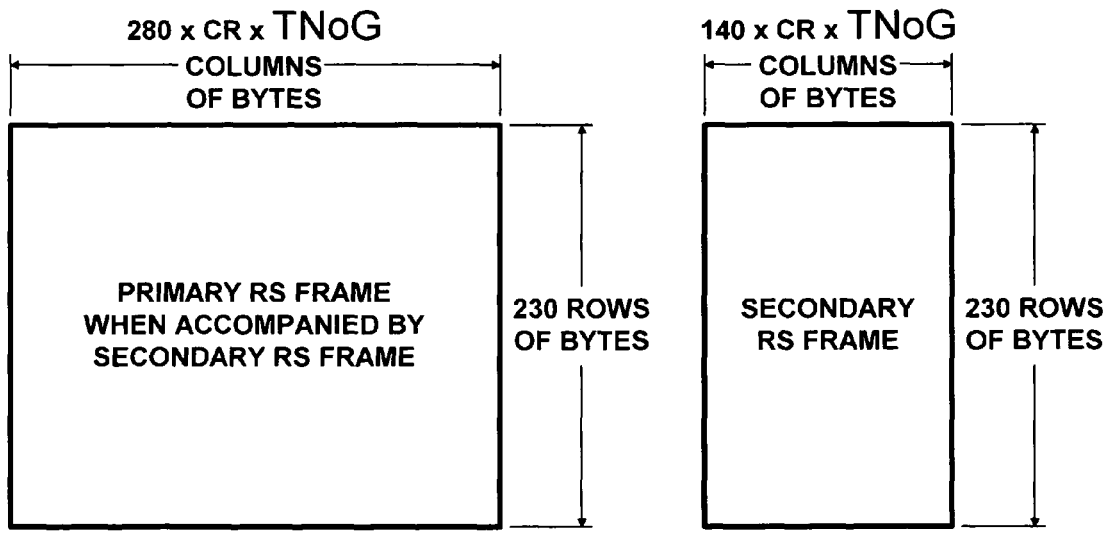
FIG. 27 is a depiction of a novel primary RS Frame format preferred in a component RS Frame encoder in the FIG. 4 M/H frame encoder when there is an accompanying secondary RS Frame.
FIG. 28 is a depiction of a novel secondary RS Frame format preferred in a component RS Frame encoder in the FIG. 2 M/H frame encoder, when a secondary RS Frame accompanies a primary RS Frame having the format depicted in FIG. 27.

FIG. 27 shows the preferred size and proportions of a primary RS Frame that is accompanied by a secondary RS Frame and that is contained within Blocks 4, 5, 6, 7 and 8 of the M/H Group(s) of the Parade. The M/H data in Block 4 are preceded by a deterministic trellis reset and a training sequence. FIG. 27 shows the primary RS Frame that is accompanied by a secondary RS Frame still to have 230 rows of 8-bit bytes. The number of 8-bit bytes in each row is 280 times NoG times the code rate CR of the outer convolutional coding. Such a primary RS Frame requires 12,880 M/H data bytes in each M/H Group. Blocks 4, 5, 6, 7 and 8 of an M/H Group contain only 12,955 M/H data bytes, supposing that none of the dummy bytes specified in A/153, Part 2, Annex A is replaced by a respective M/H data byte. However, 48 M/H data bytes in Block 8 are included in the secondary RS Frame, rather than in the primary RS Frame, and at least 12 M/H data bytes in Block 8 are appropriated for trellis reset before the secondary RS Frame begins.

FIG. 28 shows the preferred size and proportions of a secondary RS Frame that is contained within Blocks 9, 10, 1, 2 and 3 of the M/H Group(s) of the Parade. FIG. 28 shows the secondary RS Frame to have 230 rows of 8-bit bytes. The number of 8-bit bytes in each row is 140 times NoG times the code rate CR of the outer convolutional coding.

Figure 29:
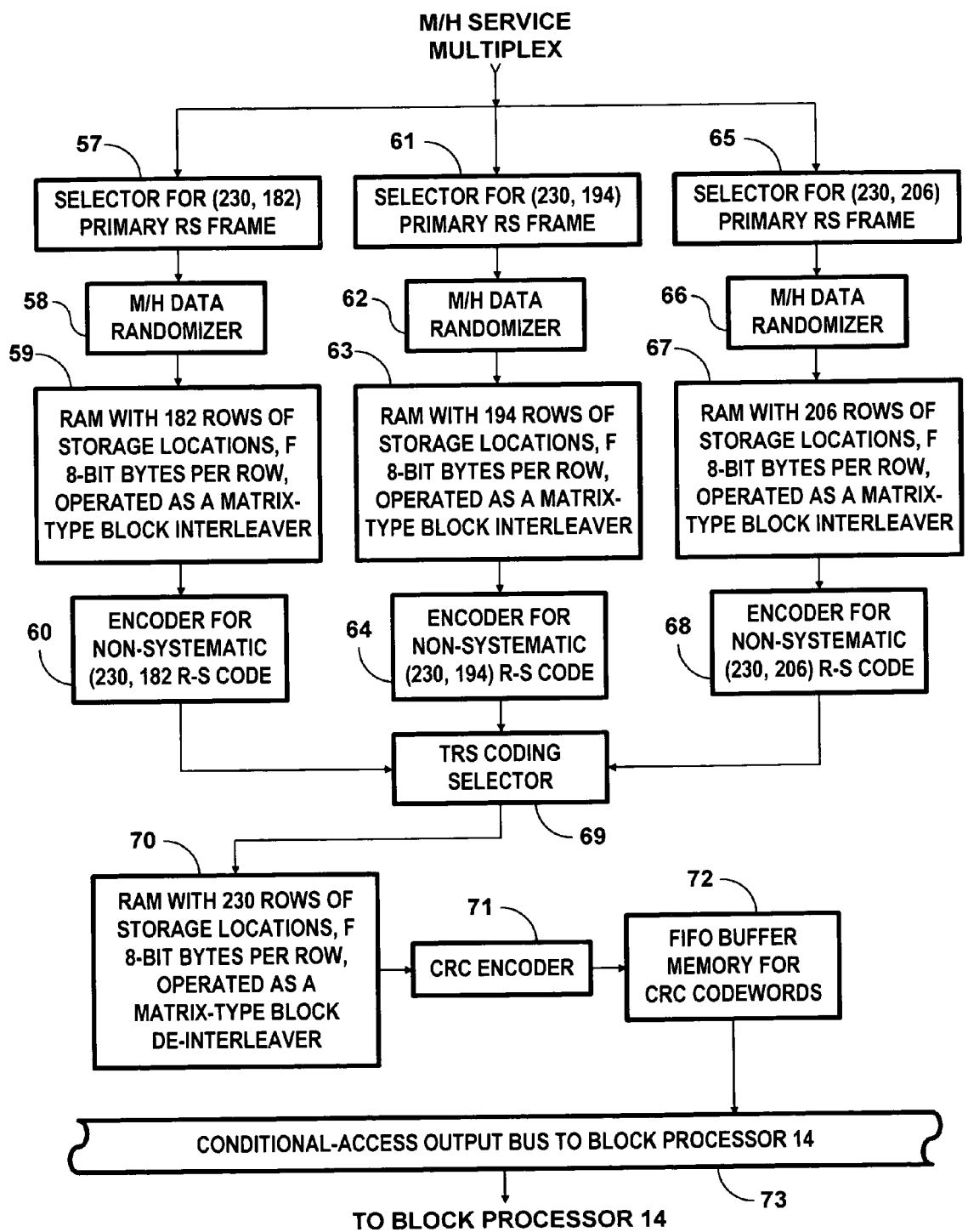
FIG. 29 is a schematic diagram of a representative embodiment of the component encoder used in the FIG. 4 M/H frame encoder to encode M/H data two-dimensionally with a transverse Reed-Solomon (TRS) code and a lateral cyclic-redundancy-check (CRC) code, thereby generating an RS Frame format as depicted in any one of the FIGS. 26, 27 and 28.

FIG. 29 shows a portion of a representative embodiment of the new M/H Frame encoder 13 in the FIG. 1 DTV transmitter apparatus. Such a portion is used to encode a primary RS Frame, whether or not it is accompanied by a secondary RS Frame. A similar portion is used to encode an accompanying secondary RS Frame, if such be used.

More particularly, FIG. 29 shows a selector 57 connected for selectively reproducing portions of the internet-protocol M/H-service multiplex signal for application to an M/H data randomizer 58 as input signal thereto. The M/H data randomizer 58 exclusive-ORs these reproduced portions of the IP M/H-service multiplex signal with a prescribed pseudo-random binary sequence (PRBS) for generating randomized IP signal supplied as write-input signal to a random-access memory 59. FIG. 29 shows the RAM 59 as having 182 rows of storage locations capable of storing a number F of 8-bit bytes per row. The RAM 59 is operated as a matrix-type block interleaver in which columns of 182 bytes are read to an encoder 60 that generates a respective non-systematic (230, 182) Reed-Solomon codeword responsive to each column of 182 bytes read thereto. That is, the RAM 59 is written row by row with successive bytes of IP packets. When writing or over-writing of the storage locations in the RAM 59 has been completed, those bytes are subsequently read column by column to the encoder 60. Each systematic (230, 182) R-S codeword generated by the encoder 60 begins by reproducing the original 182 bytes of data and concludes with 48 parity bytes.

FIG. 29 also shows a selector 61 connected for selectively reproducing portions of the internet-protocol M/H-service multiplex signal for application to an M/H data randomizer 62 as input signal thereto. The M/H data randomizer 62 exclusive-ORs these reproduced portions of the IP M/H-service multiplex signal with a prescribed pseudo-random binary sequence (PRBS) for generating randomized IP signal supplied as write-input signal to a random-access memory 63. FIG. 29 shows the RAM 63 as having 194 rows of storage locations capable of storing a number F of 8-bit bytes per row. The RAM 63 is operated as a matrix-type block interleaver in which columns of 194 bytes are read to an encoder 64 that generates a respective systematic (230, 194) Reed-Solomon codeword responsive to each column of 194 bytes read thereto. That is, the RAM 63 is written row by row with successive bytes of IP packets. When writing or over-writing of the storage locations in the RAM 63 has been completed, those bytes are subsequently read column by column to the encoder 64. Each systematic (230, 194) R-S codeword generated by the encoder 64 begins by reproducing the original 194 bytes of data and concludes with 36 parity bytes.

FIG. 29 also shows a selector 65 connected for selectively reproducing portions of the internet-protocol M/H-service multiplex signal for application to an M/H data randomizer 66 as input signal thereto. The M/H data randomizer 66 exclusive-ORs these reproduced portions of the IP M/H-service multiplex signal with a prescribed pseudo-random binary sequence (PRBS) for generating randomized IP signal supplied as write-input signal to a random-access memory 67. FIG. 29 shows the RAM 67 as having 206 rows of storage locations capable of storing a number F of 8-bit bytes per row. The RAM 67 is operated as a matrix-type block interleaver in which columns of 206 bytes are read to an encoder 68 that generates a respective systematic (230, 206) Reed-Solomon codeword responsive to each column of 206 bytes read thereto. That is, the RAM 67 is written row by row with successive bytes of IP packets. When writing or over-writing of the storage locations in the RAM 67 has been completed, those bytes are subsequently read column by column to the encoder 68. Each systematic (230, 206) R-S codeword generated by the encoder 68 begins by reproducing the original 206 bytes of data and concludes with 24 parity bytes.

FIG. 29 also shows a TRS coding selector 69 connected for receiving R-S codewords from each of the R-S encoders 60, 64 and 68. The TRS coding selector 69 is operated for selecting R-S codewords from one of the R-S encoders 60, 64 and 68 for writing to a random-access memory 70 operated as a matrix-type block de-interleaver. FIG. 24 shows the RAM 70 as having 230 rows of storage locations capable of storing the number F of 8-bit bytes per row. The bytes of the successive 230-byte R-S codewords selected by the TRS coding selector 69 are written column by column into the RAM 70. When writing or over-writing of the storage locations in the RAM 70 has been completed, those bytes are subsequently read row by row to a cyclic-redundancy-check encoder 71. The CRC encoder 71 appends two bytes of CRC parity to the conclusion of every sequence of bytes read from a respective row of the RAM 70, thereby generating a respective CRC codeword. The CRC encoder 70 is connected for writing the CRC codewords it generates to a first-in/first-out buffer memory 72 for CRC codewords. The FIFO buffer memory 72 is connected for supplying those CRC codewords to a conditional-access output bus 73 to the block processor 7.

If the FIG. 29 portion of the new M/H Frame encoder 13 is used to encode a primary RS Frame that is unaccompanied by a secondary RS Frame, the number of columns F in the RAMs 59, 63, 67 and 70 is 78 times NoG times the code rate CR of the outer convolutional coding. If the FIG. 29 portion of the new M/H Frame encoder 13 is used to encode a primary RS Frame that is accompanied by a secondary RS Frame, the number of columns F in the RAMs 59, 63, 67 and 70 is 52 times NoG times the code rate CR of the outer convolutional coding. If the FIG. 29 portion of the new M/H Frame encoder 13 is used to encode a secondary RS Frame, the number of columns F in the RAMs 59, 63, 67 and 70 is 26 times NoG times the code rate CR of the outer convolutional coding.

Figure 30:
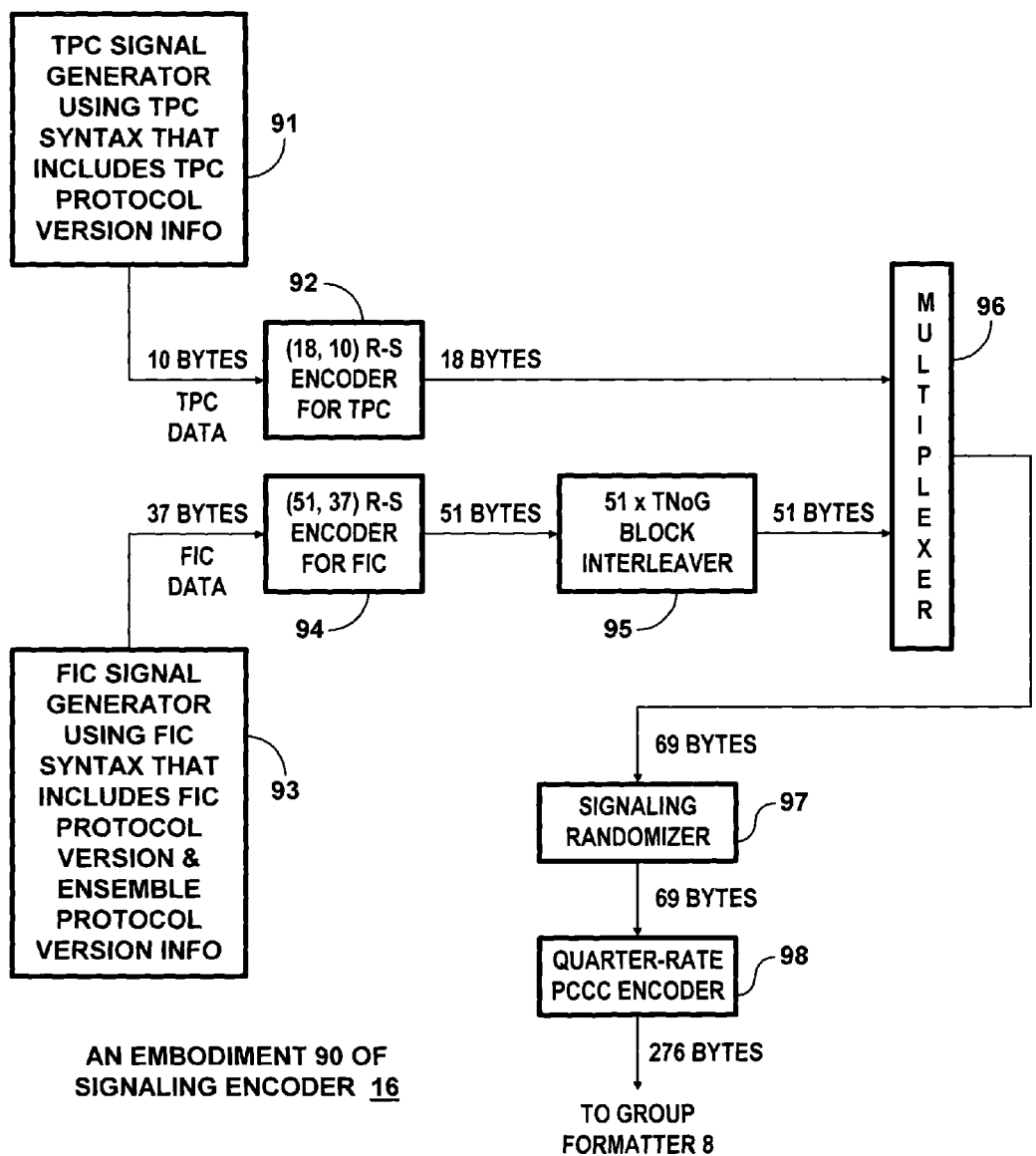
FIG. 30 is a schematic diagram of the signaling encoder employed in the FIG. 1 DTV transmitter apparatus.

FIG. 30 shows a preferred embodiment 90 of the signaling encoder 9 in FIG. 1 DTV transmitter apparatus which generates TPC and FIC signaling. FIG. 30 shows the preferred embodiment 90 of the signaling encoder 9 to include a TPC signal generator 91 and an encoder 92 for (18, 10) Reed-Solomon coding TPC bits supplied by the TPC signal generator 91. The syntax for each 10-byte TPC signal generated by the TPC signal generator 91 includes tpc_protocol_version code to provide version information. FIG. 30 shows the preferred embodiment 90 of the signaling encoder 9 further to include an FIC signal generator 93 and an encoder 94 for (51, 37) Reed-Solomon coding FIC bits supplied by the FIC signal generator 93. Each FIC-Chunk of the FIC signal generated by the FIC signal generator 93 includes both ensemble_protocol_version code for each ensemble in the FIC-Chunk payload and fic_protocol_version code in the FIC-Chunk header to provide version information. The encoder 94 encodes thirty-seven bytes per Group and is connected for supplying the resulting 51 bytes of RS-coded FIC to a matrix-type block interleaver 95. A time-division multiplexer 96 is connected for supplying a response that interleaves 51 bytes of block interleaver 95 response as received at a first input port of the multiplexer 96 between each 18-byte RS codeword received from the encoder 92 at a second input of the multiplexer 96. The multiplexer 96 is connected for supplying its response to a signaling randomizer 97. The signaling randomizer 97 is connected for supplying its response as input signal to a quarter-rate PCCC encoder 98, which is in turn connected to supply the quarter-rate PCCC that it generates to the Group formatter 8.

FIG. 31 depicts in tabular form the general syntax of the Transmission Parameter Channel (TPC) data encoded by the FIG. 30 signaling encoder. This general syntax corresponds to that described in A/153 except for the total_number_of groups_this_frame being transmitted in bits 53-57 of the last three sub-Frames of each M/H Frame. When the new primary RS Frame and new secondary RS Frame are used, the tpc_protocol_version_major_update shall be incremented by one to signal this usage to M/H receivers. This change in tpc_protocol_version_major_update signals differences in the way that rs_frame_mode, rs_code_mode_primary, rs_code_mode_secondary, ccc_outer_code_mode_a, ccc_outer_code_mode_b, ccc_outer_code_mode_c and ccc_outer_code_mode_d are to be interpreted. With this tpc_protocol_version_major_update, the ccc_outer_code_mode_a and the ccc_outer_code_mode_b both refer to the portion of the M/H Group used for encoding at least the initial portion of the primary RS Frame. With this tpc_protocol_version_major_update, the ccc_outer_code_mode_c and the ccc_outer_code_mode_d both refer to the portion of the M/H Group used either for encoding the secondary RS Frame or for encoding the final portion of the primary RS Frame when there is no accompanying secondary RS Frame. It is presumed that one bit of the tpc_protocol_version_major_update will be '1' when the CCC of M/H data is SCCC and will be '0' when the CCC of M/H data is PCCC. It is presumed that one bit of the tpc_protocol_version_major_update will be '1' when primary and will be '0' when the CCC of M/H data is PCCC. Alternatively, one of the reserved bits 60-75 can be used to indicate whether the CCC is SCCC or PCCC. It is presumed that another bit of the tpc_protocol_version_major_update will be '1' when CCC'd M/H data is transmitted in the normal time order specified in A/153 and will be '0' when the CCC'd M/H data is transmitted in permuted time order. Alternatively, one or more of the reserved bits 60-75 can be used to indicate the time order in which CCC'd M/H data is transmitted.

FIG. 32 depicts in tabular form the specific syntax of the ccc_outer_code_mode specified by the bits 31-32, by the bits 33-34, by the bits 35-36 and by the bits 37-38 of the FIG. 31 table. Any of these pairs of bits being 00 specifies that the code rate of the outer convolutional coding for the M/H Group is 1/2, corresponding to what is specified in A/153. Any of these pairs of bits being 01 specifies that the code rate of the outer convolutional coding is 1/4, corresponding to what is specified in A/153. Any of these pairs of bits being 10 specifies that the code rate of the outer convolutional coding is 1/3, in a departure from what A/153 specifies.

FIG. 33 depicts in tabular form the specific syntax of the rs_frame_mode specified by the bits 25-26 of the FIG. 31 table, presuming that a bit of the tpc_protocol_version_major_update or a bit of the tpc_protocol_version_minor_update or a reserved bit indicates that portions of primary RS Frames begin in Block 4 of each M/H Group. Bits 25-26 being 00 specifies that there is only a primary RS Frame for the Parade containing the M/H Group including the TPC. A respective portion of this primary RS Frame begins in Block 4 of the M/H Group, has wrap-around and concludes in Block 3 of the same M/H Group. Bits 25-26 being 01 specifies that there is both a primary RS Frame and a secondary RS Frame for the Parade containing the M/H Group including the TPC. A respective portion of the primary Frame begins in Block 4 of the M/H Group and concludes in Block 8 of the same M/H Group. A respective portion of the secondary RS Frame begins in Block 8 of the M/H Group, has wrap-around and concludes in Block 3 of the same M/H Group. Bits 25-26 being 10 specifies that there is only a primary RS Frame for the Parade containing the M/H Group including the TPC. A respective portion of this primary Frame begins in Block 4 of the M/H Group, has no wrap-around and concludes in Block 3 of the next-transmitted M/H Group in the same Ensemble. Bits 25-26 being 11 specifies that there is both a primary RS Frame and a secondary RS Frame for the Parade containing the M/H Group including the TPC. A respective portion of the primary Frame begins in Block 4 of the M/H Group and concludes in Block 8 of the same M/H Group. A respective portion of the secondary RS Frame begins in Block 8 of the M/H Group, has no wrap-around and concludes in Block 3 of the next-transmitted M/H Group in the same Ensemble.

FIG. 34 depicts in tabular form the specific syntax of the rs_code_mode specified by the bits 27-28 and by the bits 29-30 of the FIG. 31 table. Either of these pairs of bits being 00 specifies that (230, 182) TRS coding is employed to generate the RS Frame that they relate to. Either of these pairs of bits being 01 specifies that (230, 194) TRS coding is employed to generate the RS Frame that they relate to. Either of these pairs of bits being 10 specifies that (230, 206) TRS coding is employed to generate the RS Frame that they relate to.

FIGS. 35A, 35B, 35C and 35D combine to provide a FIG. 35 schematic diagram of DTV receiver apparatus for receiving M/H transmissions sent over the air from the FIG. 1 DTV transmitter apparatus. The FIG. 35A portion of DTV receiver apparatus includes a vestigial-sideband amplitude-modulation (VSB AM) DTV receiver front-end 100 for selecting a radio-frequency DTV signal for reception, converting the selected RF DTV signal to an intermediate-frequency DTV signal, and for amplifying the IF DTV signal. An analog-to-digital converter 101 is connected for digitizing the amplified IF DTV signal supplied from the DTV receiver front-end 100. A demodulator 102 is connected for demodulating the digitized VSB AM IF DTV signal to generate a digitized baseband DTV signal, which is supplied to an adaptive channel-equalizer 103. Synchronization signals extraction circuitry 104 is connected for receiving the channel-equalizer 103 response. Responsive to data-field-synchronization (DFS) signals, the sync extraction circuitry 104 detects the beginnings of data frames and fields. Responsive to data-segment-synchronization (DSS) signals, the sync extraction circuitry 104 detects the beginnings of data segments. The FIG. 35 DTV receiver apparatus uses the DSS and DFS signals for controlling its operations similarly to the way this is conventionally done in DTV receivers. None of FIGS. 35A, 35B, 35C and 35D explicitly shows the circuitry for effecting these operations.

A decoder 105 for determining the kind of transmission responds to 8-bit sequences contained in final portions of the reserved portions of DFS signals separated by the sync extraction circuitry 104. The decoder 105 is connected for indicating the kind of transmission to the adaptive channel-equalizer 103 so the adaptive channel-equalizer 103 can determine the times when prescribed known symbols should be received. The decoder 105 is connected for also indicating the kind of transmission to turbo decoding control circuitry 106 that controls turbo decoding in the FIG. 35 DTV receiver apparatus. The kind of transmission that the decoder 105 detects may be one that conditions the decoder 105 to extract further information concerning an ancillary transmission such as an M/H transmission from the initial portions of the reserved portions of DFS signals separated by the sync extraction circuitry 104. The decoder 105 is connected for supplying such further information to the turbo decoding control circuitry 106. Most of the connections of the turbo decoding control circuitry 106 to the elements involved in decoding the concatenated convolutional codes are not explicitly shown in FIGS. 35A, 35B, 35C and 35D, so as to keep those figures from being too cluttered to be understood readily.

Figure 35A:
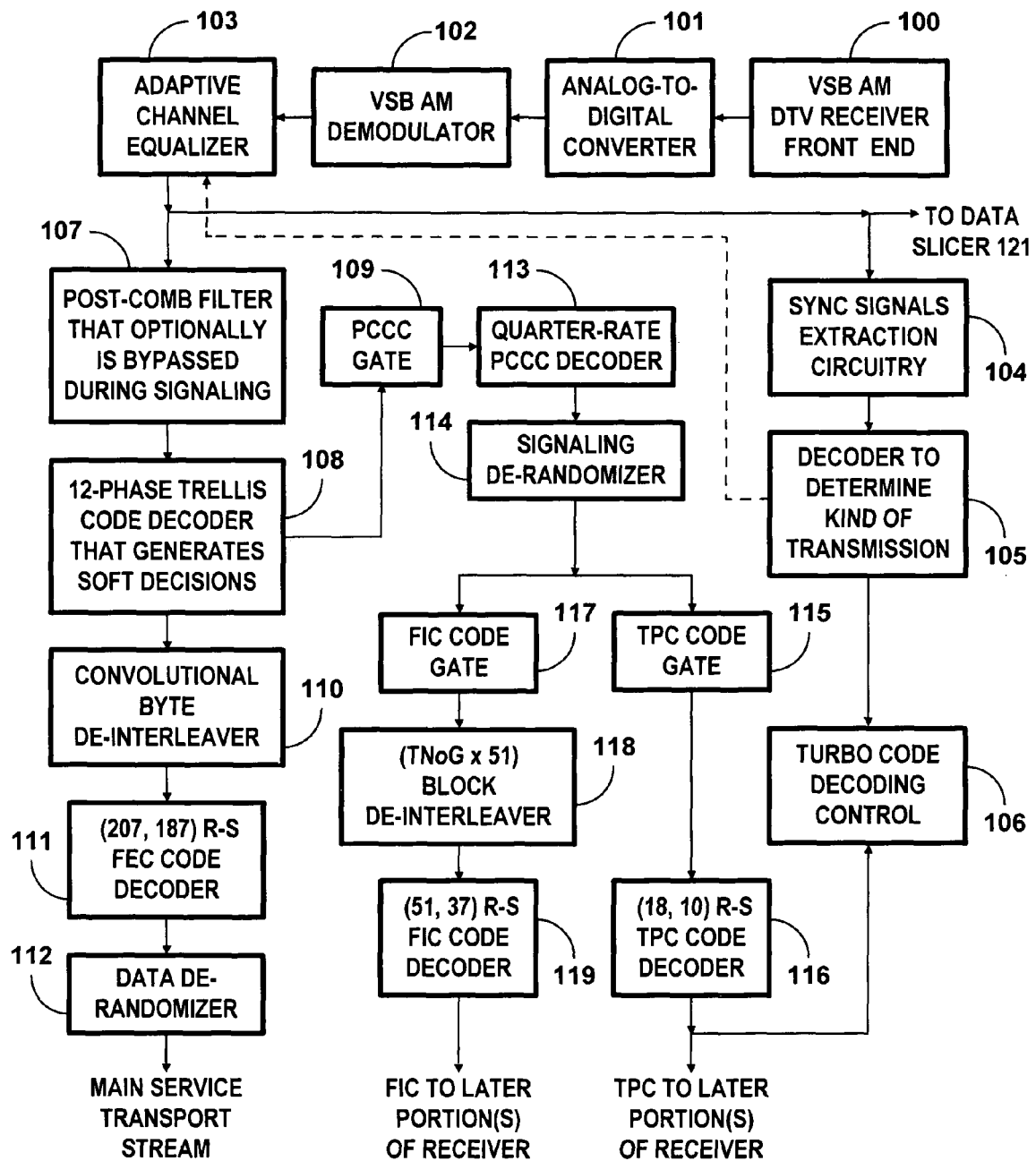
FIGS. 35A, 35B, 35C and 35D combine to provide a FIG. 35 schematic diagram of DTV receiver apparatus for usefully receiving the DTV signals transmitted by the FIG. 1 DTV transmitter apparatus.

FIG. 35A shows a connection from the output port of the adaptive channel equalizer 103 to the input port of a post-comb filter 107, the output port of which is connected to supply the adaptive 12-phase trellis decoder 108 with input signal. The 12-phase trellis decoder 108 is connected for supplying trellis-decoding results to a PCCC gate 109 and to a byte de-interleaver 110. If the DTV transmitter does not pre-code the most significant bits of the 8VSB symbols during the intervals when the TPC and FIC signaling is transmitted, the post-comb filter 107 is selectively bypassed during those intervals.

The byte de-interleaver 110 provides byte-by-byte de-interleaving of the trellis-decoding results to generate input signal for a Reed-Solomon decoder 111 of the de-interleaved (207, 187) RS FEC codewords supplied from the byte de-interleaver 110. The de-interleaving performed by the byte de-interleaver 110 complements the convolutional byte interleaving prescribed by A/53, Annex D, §4.2.4. Preferably, the de-interleaved (207, 187) RS FEC codewords are accompanied by soft-decision information, and the RS decoder 111 is of a sort that can use the soft-decision information to improve overall performance of the decoders 108 and 111. The RS decoder 111 is connected for supplying packets of randomized hard-decision data to a data de-randomizer 112, which exclusive-ORs the bits of the randomized hard-decision data with appropriate portions of the PRBS prescribed in A/53, Annex D, §4.2.2 to generate a first transport stream. This first transport stream is constituted in part of MPEG-2-compatible packets of de-randomized principal data. Insofar as the RS decoder 111 is capable, it corrects the hard-decision 187-byte randomized data packets that it supplies to the data de-randomizer 112. The output signal from the data de-randomizer 112 reproduces the main-service multiplex transport stream.

The PCCC gate 109 is connected for extracting the PCCC'd signaling within each Group from the trellis-decoding results and reproducing the PCCC'd signaling for application as input signal to a decoder 113 for quarter-rate PCCC. The decoder 113 reproduces randomized signaling decoded (possibly with some errors) from the quarter-rate PCCC supplied thereto and is connected for supplying that randomized signaling as input signal to a signaling de-randomizer 114. A TPC code gate 115 is connected for extracting the TPC code content from the randomized signaling and reproducing the TPC code content for application as input signal to a decoder 116 for (18, 10) Reed-Solomon coding. The decoder 116 recovers TPC information and is connected for supplying the TPC information both to the turbo decoding control circuitry 106 and to a later portion or portions of the receiver apparatus. An FIC code gate 117 is connected for extracting the byte-interleaved FIC code content from the randomized signaling and reproducing that extracted content for application as input signal to a block de-interleaver 118 of matrix type. The block de-interleaver 118 is connected for supplying its de-interleaved FIC code response to a decoder 119 for (51, 37) Reed-Solomon coding as input signal thereto. The decoder 119 recovers FIC information and is connected for supplying the FIC information to a later portion or portions of the receiver apparatus.

Figure 35B:
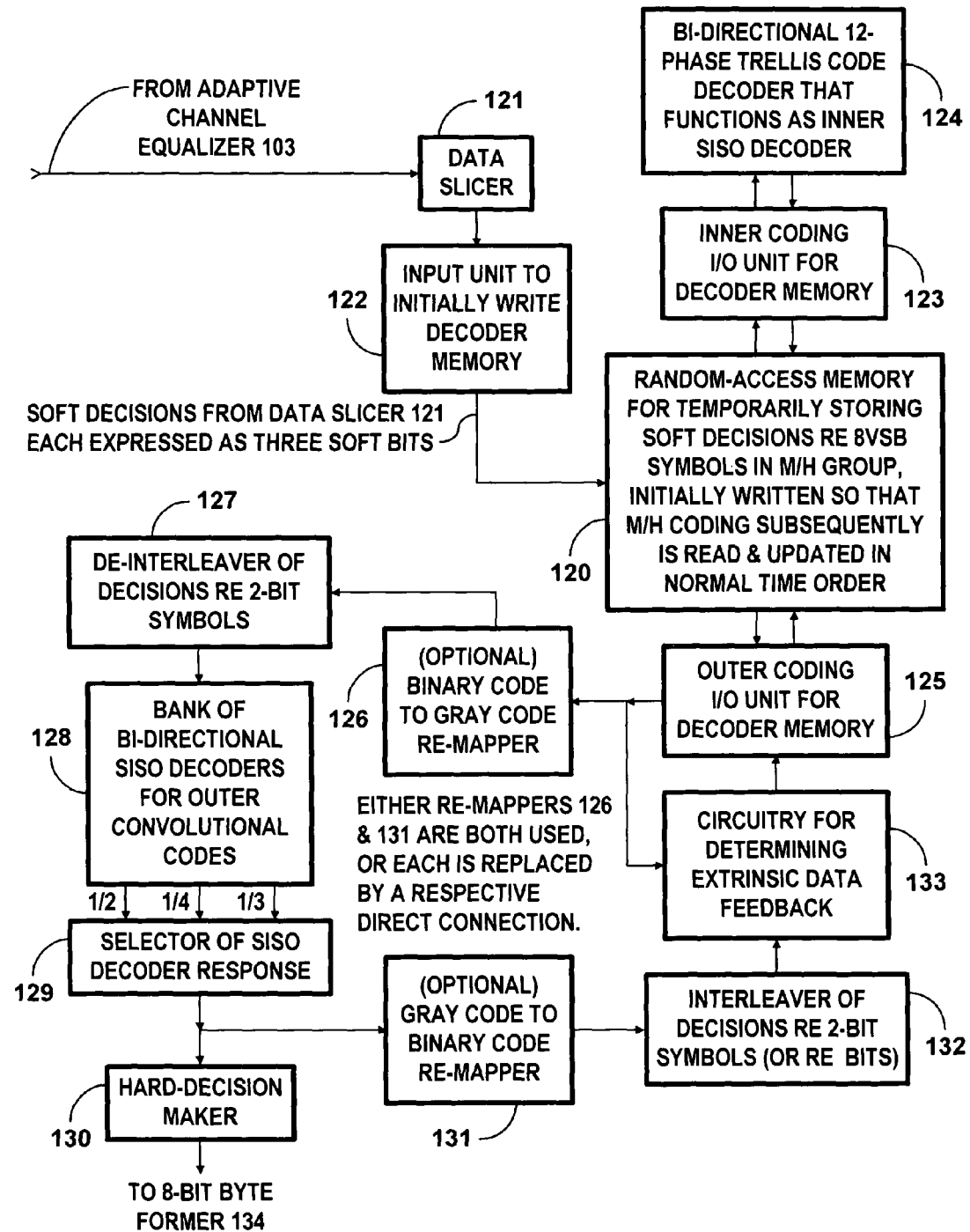

FIG. 35B shows turbo decoding circuitry for ancillary transmissions, which differs from previous turbo decoding circuitry for ancillary transmissions in that a random-access memory 120 for temporarily storing soft decisions concerning 8VSB symbols is initially written so that M/H coding is de-permuted during subsequent reading and updating. That is, RAM 120 is operated so as to undo the permutation of outer convolutional coding that the RAM 54 of FIG. 6 performed in the DTV transmitter, as described supra. The write addressing for the RAM 120 during the initial writing of the 8VSB symbols within the 8VSB data segments including fragments of an M/H Group, to be temporarily stored during turbo decoding, is supplied by a different address generator than the ones used during turbo decoding. Each of these address generators, not explicitly depicted in FIG. 35, can be composed of respective read-only memory storing a list of valid addresses that are successively scanned by selectively applying an input address scan thereto from a scan generator. The scan generator is typically a counter for gated symbol clock signals.

FIG. 35B shows a data slicer 121 connected for receiving, as its input signal, the 8VSB symbols in the response of the adaptive channel-equalizer 103. An input unit 122 to initially write the RAM 120 converts each soft decision from the data slicer 121 concerning a respective 8VSB symbol to three soft bits to be written into the RAM 120. Although not explicitly shown, the input unit 122 to initially write the RAM 120 also comprises the write address generator used for addressing the storage locations within the RAM 120 into which the soft bits supplied by the input unit 122 are written. The addressed storage locations contain soft bits of 8VSB symbols not only for M/H-service transmission within the M/H Group, but also for fragments of main-service 8VSB coding dispersed among fragments of M/H-service 8VSB coding within the M/H Group.

An input/output unit 123 is used for reading inner convolutional coding from the RAM 120 to a trellis decoder 124 and for writing inner convolutional coding as updated by the trellis decoder 124 to the RAM 120. The 12-phase trellis decoder 124 is a soft-input, soft-output (SISO) inner decoder for the FIG. 35B turbo decoder. Although not explicitly shown, the I/O unit 123 also comprises the address generator used for addressing the storage locations within the RAM 120 when reading to the trellis decoder 124 or being updated from the trellis decoder 124. The addressed storage locations contain inner convolutional coding not only for M/H-service transmission within the M/H Group, but also for fragments of main-service inner convolutional coding dispersed among fragments of M/H-service inner convolutional coding within the M/H Group.

Another input/output unit 125 is used for reading outer convolutional coding from the RAM 120 and for writing updates to the outer convolutional coding to the RAM 120 at the conclusion of each cycle of turbo decoding. Although not explicitly shown, the I/O unit 125 also comprises the address generator used for addressing the storage locations within the RAM 120 when reading outer convolutional coding therefrom or updating the temporarily stored outer convolutional coding. The addressed storage locations contain outer convolutional coding for M/H-service transmission within the M/H Group, but skip accessing fragments of main-service coding dispersed among fragments of M/H-service coding within the M/H Group. Despite FIG. 35B showing them as separate elements, the input unit 122, the I/O unit 123 and the I/O unit 125 may each share some elements in common with one or both of the others. Responsive to control by the turbo code decoding control circuitry 106, the input/output circuitry 125 reads soft-decisions related to the reproduced interleaved outer convolutional coding of the CCC to the input port of a binary-to-Gray-code re-mapper 126, presuming that the outer convolutional coding is Gray-code labeled. The response of the binary-to-Gray-code re-mapper 126 is then supplied to the input port of a 2-bit-symbol de-interleaver 127. If the outer convolutional coding is not Gray-code labeled, the binary-to-Gray-code re-mapper 126 is omitted, and the input/output circuitry 125 reads soft-decisions related to the reproduced interleaved outer convolutional coding of the CCC directly to the input port of the de-interleaver 127.

The de-interleaver 127 is connected for de-interleaving the interleaved outer convolutional coding of the SCCC and supplying soft-decisions related to the de-interleaved outer convolutional coding to a bank 128 of bi-directional SISO decoders. E.g., the bank 128 of SISO outer decoders comprises decoders for one-half-rate, one-third-rate and one-quarter-rate outer convolutional coding. (FIG. 35B does not explicitly show these respective decoders in the bank 128.) Control signal received from the turbo decoding control circuitry 106 via a connection not explicitly shown in FIGS. 35A, 35B, 35C and 35D conditions only a selected one of these decoders for current decoding. The decoding operations of the decoder 124 and the selected one of the bank 128 of decoders are staggered in time. The decoder 124 and the decoders in the bank 128 of them may be of types that use soft-output Viterbi algorithm (SOVA) for evaluating code trellises, but preferably are of types that use the log-MAP algorithm for such evaluations. A selector 129 of SISO decoder response is connected for receiving decoding results from each of the SISO outer decoders in the bank 128 of them and reproducing the decoding results of the selected one of these decoders in its own response. This selection is controlled by the turbo code decoding control circuitry 106 via a connection to the selector 129 not explicitly shown in FIGS. 35A, 35B, 35C and 35D. (In an alternative construction only a selected one of the SISO outer decoders in the bank 128 of them is energized, rather than the selector 125 being used to obtain decoding results from only a selected one of those SISO outer decoders.) A hard-decision maker 130 is connected for serially supplying bits descriptive of hard-decision decoding results in response to portions of the selector 129 response supplied at the conclusion of turbo decoding an M/H Group.

The selector 129 is further connected for supplying the reproduced soft decisions concerning the decoding results from a selected one of the bank 128 of SISO outer decoders to the input port of a Gray-to-binary-code re-mapper 131, presuming that the outer convolutional coding is Gray-code labeled. The response of the Gray-to-binary-code re-mapper 131 is then supplied to the input port of an interleaver 132 for soft decisions. If the outer convolutional coding is not Gray-code labeled, the selector 129 is further connected for supplying the reproduced soft decisions concerning the decoding results from a selected one of the bank 128 of SISO outer decoders directly to the input port of the interleaver 132 for soft decisions. If the CCC is SCCC, the interleaver 132 is for soft decisions concerning 2-bit-symbols and is complementary to the de-interleaver 127. If the CCC is PCCC, the interleaver 132 can be for soft decisions concerning 2-bit-symbols, but alternatively can be just for soft decisions concerning data bits.

Circuitry 133 for determining extrinsic data feedback compares the interleaved decoding results from the interleaver 132 with previous trellis decoder 124 decoding results supplied via the input/output circuitry 125. In some embodiments of the turbo decoder the previous trellis decoder 124 decoding results are temporarily stored in the circuitry 133 at the time they are supplied for possible re-mapping and for de-interleaving by the de-interleaver 127. In other embodiments of the turbo decoder the previous trellis decoder 124 decoding results are extracted from the RAM 120 just before they are needed. This extrinsic information is fed back through the input/output circuitry 125 to update soft bits of M/H symbols temporarily stored in the RAM 120.

The structure of the binary-to-Gray-code re-mapper 126 and the structure of the Gray-to-binary-code re-mapper 131 are similar. In a representative structure each of the bits of the less significant soft bit of each two-soft-bits symbol is exclusive-ORed with the hard-decision bit of the more significant soft bit to perform the re-mapping. The re-mapping techniques were described in detail in U.S. patent application Ser. No. 12/456,608 filed 20 Jun. 2009 by A. L. R. Limberg, titled "System for digital television broadcasting using modified 2/3 trellis coding" and published on 31 Dec. 2009 with Pub. No. 2009-0322961.

Figure 35C:
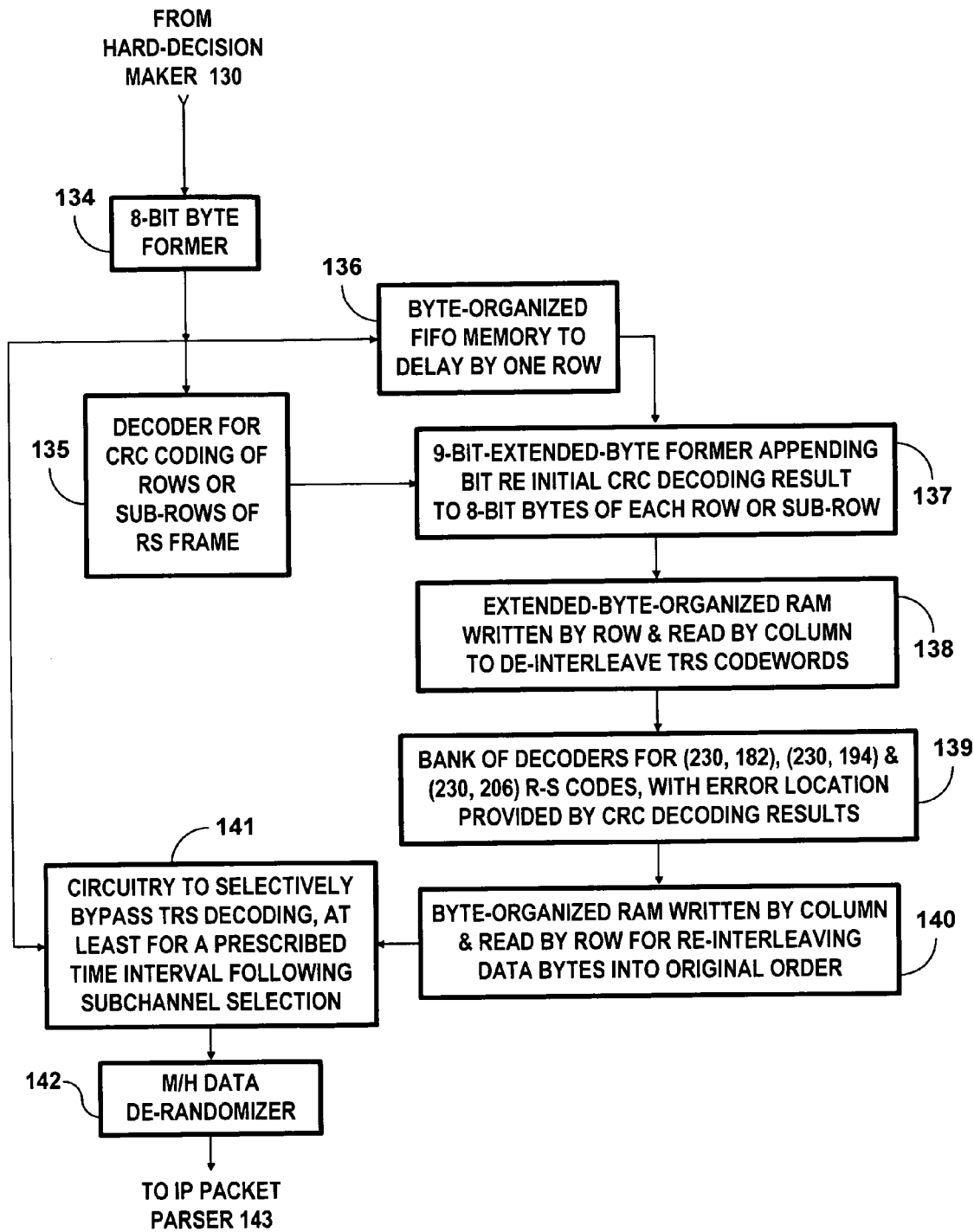

FIG. 35C shows apparatus for regenerating RS Frame data from the hard decisions supplied from the hard-decision maker 130. An 8-bit-byte former 134 is connected for receiving the hard-decision bits supplied serially from the hard-decision maker 130 and forming them into successive 8-bit bytes. Rows or sub-rows of these 8-bit bytes that will be used for reproducing RS Frames are supplied to a decoder 135 for cyclic-redundancy-check (CRC) coding and thence to a byte-organized first-in, first-out memory 141. At the conclusion of each row or sub-row of 8-bit bytes the decoder 135 generates a bit indicating whether or not it found the row or sub-row probably to contain error. The FIFO memory 141 reproduces each row or sub-row of 8-bit bytes it receives as delayed by a row or sub-row interval and supplies those 8-bit bytes to a nine-bit-extended-byte former 142. The extended-byte former 142 appends to each of the 8-bit bytes the bit indicating whether or not the decoder 135 found the row or sub-row probably to contain error.

The resulting 9-bit extended bytes are written row by row into respective rows of extended-byte storage locations in a random-access memory 143 operated to perform the matrix-type block de-interleaving procedure that is a first step of the TRS decoding routine. The RAM 143 is subsequently read one column of 9-bit extended bytes at a time to a selected one of a bank 144 of decoders for (230, 182), (230, 194) and (230, 206) Reed-Solomon codes, respectively. The appropriate decoder is selected by the turbo decoding control circuitry 106 responsive to information extracted from the TPC. The extension bits accompanying the 8-bit bytes of the TRS code are used to help locate byte errors for the TRS code. This permits the use of a Reed-Solomon algorithm capable of correcting more byte errors than an algorithm that must locate byte errors as well as correct them. The 8-bit data bytes that have been corrected insofar as possible by the selected one of the RS decoders in the bank 144 are written, column by column, into respective columns of byte-storage locations of a random-access memory 145. The RAM 145 is operated to perform the matrix-type block re-interleaving procedure for data in further steps of the TRS decoding routine. In a final step of the TRS decoding routine, the byte-storage locations in the RAM 145 are read from row by row to circuitry 146, which is used to by-pass TRS decoding for a prescribed time interval after sub-channel selection. During that prescribed time interval, bytes supplied directly from the byte former 134 are reproduced by the circuitry 146 for application as input signal to an M/H data de-randomizer 147. After that prescribed time interval, bytes read from the RAM 145 are reproduced by the circuitry 146 for application as input signal to the M/H data de-randomizer 147. The M/H data de-randomizer 147 de-randomizes the contents of the data bytes by exclusive-ORing the bits therein with the prescribed PRBS. The exclusive-ORing is customarily done after a byte-to-bit conversion and is followed by a bit-to-byte conversion.

Transversal RS coding can correct drop-outs in received signal strength of a few hundred milliseconds in duration. TRS allows the TS packets to be immediately available so long as there is no drop-out in received signal strength. The CRC checksums on the rows of bytes in the RS framestore can locate rows afflicted by drop-out of received signal strength, doubling the capability of the RS code of given word-length to correct byte errors. When the M/H system was being developed, MPEG-2 packets were used in the transport stream (TS), and the CRC checksums at the ends of rows were used to validate TS packets in the rows of bytes in the RS Frames. Internet Protocol (IP) will be the TS used in the M/H Standard rather than MPEG-2 TS. When IP is used, the CRC checksums at the ends of rows are not used to validate TS packets.

Figure 35D:
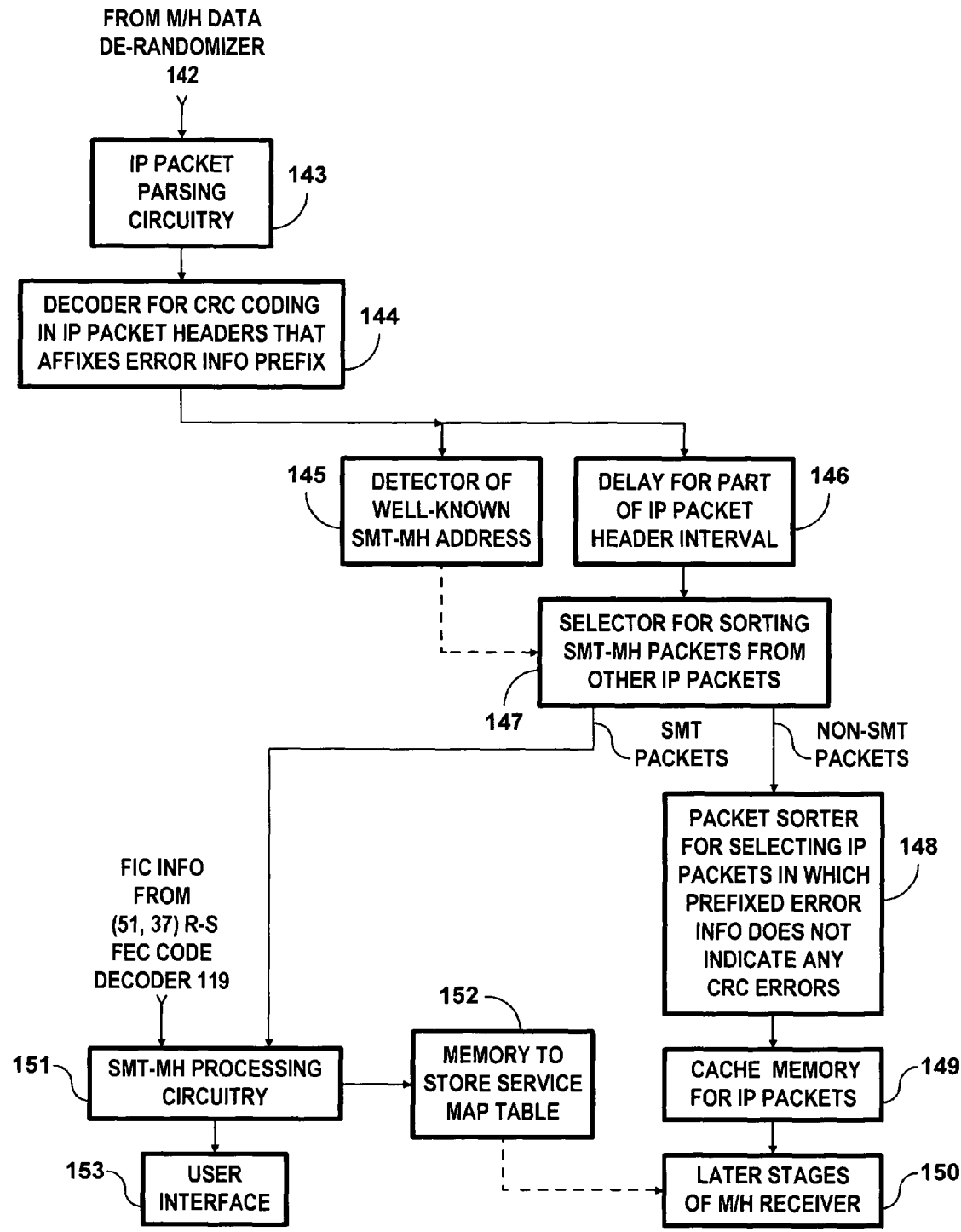

Referring now to FIG. 35D, the M/H data de-randomizer 147 is connected for supplying the de-randomized bytes of M/H data and their accompanying extension bits to parsing circuitry 148 for parsing the data stream into internet-protocol (IP) packets. The IP-packet parsing circuitry 148 performs this parsing responsive to two-byte row headers respectively transmitted at the beginning of each row of IP data in the RS Frame. This row header indicates where the earliest start of an IP packet occurs within the row of IP data bytes within the RS Frame. If a short IP packet is completely contained within a row of the RS Frame, the IP-packet parsing circuitry 148 calculates the start of a later IP packet proceeding from the packet length information contained in the earlier IP packet within that same row of the RS Frame.

The IP-packet parsing circuitry 148 is connected for supplying IP packets to a decoder 149 for cyclic-redundancy-check coding in IP packets. Each IP packet contains a two-byte, 16-bit checksum for CRC coding that IP packet. The decoder 149 is constructed to preface each IP packet that it reproduces with a prefix bit indicating whether or not error has been detected in that IP packet. The decoder 149 is connected to supply these IP packets as so prefaced to a detector 150 of a "well-known" SMT-MH address and to delay circuitry 151. The delay circuitry 151 delays the IP packets supplied to a selector 152 for sorting SMT-MH packets from other IP packets. The delay circuitry 151 provides delay of a part of an IP packet header interval, which delay is long enough for the detector 150 to ascertain whether or not the "well-known" SMT-MH address is detected.

If the detector 150 does not detect the "well-known" SMT-MH address in the IP packet, the detector 150 output response conditions the selector circuitry 152 to reproduce the IP packet for application to a packet sorter 153 as input signal thereto. The packet sorter 153 sorts out those IP packets in which the preface provides no indication of CRC coding error for writing to a cache memory 154 for IP packets. The prefatory prefix bit before each of the IP packets that indicates whether there is CRC code error in its respective bytes is omitted when writing the cache memory 154. The cache memory 154 temporarily stores at least those IP packets not determined to contain CRC code error for possible future reading to the later stages 155 of the receiver.

If the detector 150 does detect the "well-known" SMT-MH address in the IP packet, establishing it as an SMT-MH packet, the detector 150 output response conditions the selector circuitry 152 to reproduce the SMT-MH packet for application to SMT-MH processing circuitry 156, which includes circuitry for generating control signals for the later stages 155 of the M/H receiver. FIG. 35C shows the SMT-MH processing circuitry 156 connected for receiving FIC information from the decoder 119 for (51, 37) RS FEC code in FIG. 35A. The SMT-MH processing circuitry 156 integrates this FIC information with information from SMT-MH packets during the generation of Service Map Data. The Service Map Data generated by the SMT-MH processing circuitry 156 is written into memory 157 for temporary storage therewithin and subsequent application to the later stages 155 of the M/H receiver. The SMT-MH processing circuitry 156 relays those SMT-MH packets that have bit prefixes that do not indicate error in the packets to a user interface 158, which includes an Electronic Service Guide (ESG) and apparatus for selectively displaying the ESG on the viewing screen of the M/H receiver.

FIG. 36 depicts M/H data flow into RS framestore memory in the DTV receiver apparatus of FIG. 35B when there is a primary RS Frame being received that is not accompanied by a secondary RS Frame during transmission. The results of decoding Blocks 1, 2 and 3 of each successive M/H Group in a Parade are stored within RS framestore memory in storage locations that will be read subsequent to the storage locations for the results of decoding Blocks 4, 5, 6, 7, 8, 9 and 10 of that M/H Group. When a primary RS Frame that is unaccompanied by a secondary RS Frame is being received, the FIG. 36 arrangement of RS framestore memory will be used in the RAMs 143 and 145. The FIG. 35 arrangement of RS framestore memory will also be used in the memory associated with the decoder 120 for 12-phase trellis code and in the memory associated with the bank 121 of SISO outer code.

FIG. 37 is a depiction of M/H data flow into RS framestore memory in the DTV receiver apparatus of FIG. 35B when there is a primary RS Frame being received that is accompanied by a secondary RS Frame during transmission. The results of decoding Blocks 4, 5, 6, 7 and 8 (in part) of that MM Group of each successive M/H Group in a Parade are stored successively within RS framestore memory. Such framestore memory can be a portion of the RS framestore memory used for storing a primary RS Frame that is transmitted without an accompanying secondary RS Frame. When a primary RS Frame that is accompanied by a secondary RS Frame is being received, the FIG. 37 arrangement of RS framestore memory will be used in the RAMs 143 and 145. The FIG. 37 arrangement of RS framestore memory will also be used in the memory associated with the decoder 120 for 12-phase trellis code and in the memory associated with the bank 121 of SISO outer code.

FIG. 38 is a depiction of M/H data flow into RS framestore memory in the DTV receiver apparatus of FIG. 35B when there is a secondary RS Frame being received. The results of decoding Blocks 1, 2 and 3 of each successive M/H Group in a Parade are stored within RS framestore memory in storage locations that will be read subsequent to the storage locations for the results of decoding Blocks 8 (in part), 9 and 10 of that M/H Group. Such framestore memory can be a portion of the RS framestore memory used for storing a primary RS Frame that is transmitted without an accompanying secondary RS Frame. When a secondary RS Frame is being received, the FIG. 38 arrangement of RS framestore memory will be used in the RAMs 143 and 145. The FIG. 38 arrangement of RS framestore memory will also be used in the memory associated with the decoder 120 for 12-phase trellis code and in the memory associated with the bank 121 of SISO outer code.

FIGS. 36, 37 and 38 depict the M/H data flow into RS framestore memory in the DTV receiver apparatus of FIG. 35B. However, one should understand that these M/H data flows are attributable to the way that the RAM 120 in the FIG. 35B turbo decoder is operated. The RAM 120 is initially written to place Blocks 4, 5, 6, 7, 8, 9 and 10 before Blocks 1, 2 and 3 of the M/H Group during subsequent exchanges of soft bits between the RAM 120 and the turbo decoding loop. Turbo decoding then progresses through at least a selected portion of Blocks 4, 5, 6, 7, 8, 9, 10, 1, 2 and 3 considered sequentially in that order.

M/H receivers that embody aspects of the invention may be constructed so as to de-permute the earlier and later portions of M/H Groups while they are still in baseband 8VSB symbols format—i.e., before data-slicing. The de-permutation is done using memory to store temporarily the baseband 8VSB symbols in each M/H Group, including the main-service 8VSB symbols interspersed among the M/H-service 8VSB symbols. The memory is addressed differently during its writing and its subsequent reading. The turbo decoders of these M/H receivers still require memory for storing soft decisions concerning inner and outer convolutional coding, besides the additional memory for de-permuting the earlier and later portions of M/H Groups. Because of the additional memory involved in the construction of these M/H receivers, the FIG. 35 receiver is preferred over them.

Variants of the FIG. 1 transmitter and of the FIG. 35 receiver, which variants also embody aspects of the invention, have been contemplated by the inventor. The symbol interleaving of the outer convolution coding can be implied, for example. The receiver is then modified to extract turbo decoding results from the inner SISO decoder, rather than from the outer SISO decoder. The two-dimensional coding of RS Frames may use TRS coding together with coding other than CRC coding of rows of bytes as prescribed by A/153. The techniques for initializing inner convolutional coding at the beginning and conclusion of each M/H Group may be employed in Scalable Full Channel Mobile Mode (SFCMM) transmissions. These and other variants of the FIG. 1 transmitter and of the FIG. 35 receiver should be considered to be within the scope of the claims that follow, presuming them to take at least some of the steps to terminate the CCC of M/H data that are described supra.

In the claims which follow, the word "said" rather than the definite article "the" is used to indicate the existence of an antecedent basis for a term having being provided earlier in the claims. The definite article "the" is used for purposes other than to indicate the existence of an antecedent basis for a term having being provided earlier in the claims, the usage of the definite article "the" for other purposes being consistent with normal grammar in the American English language.

What is claimed is:

1. Improved transmitter apparatus for transmitting an 8VSB digital television signal modulated in accordance with successive eight-level symbols, said 8VSB digital television signal employing 12-phase 2/3 trellis coding that functions as inner convolutional coding for concatenated convolutionally coded portions of said 8VSB digital television signal designed to be received usefully by receivers apt to be in motion such as mobile or hand-held types collectively referred to as "M/H receivers", successive bytes of said concatenated convolutionally coded portions of said 8VSB digital television signal having outer convolutional coding and being arranged in M/H Groups, successive ones of said M/H Groups being spaced apart from each other by strings of bytes without outer convolutional coding, wherein each of said M/H Groups respectively includes a respective signaling sequence of 8VSB symbols and respective first through fifth training sequences of 8VSB symbols of prescribed values thereafter, wherein said improved transmitter apparatus comprises:

an encoder for said 12-phase 2/3 trellis coding that functions as inner convolutional coding for concatenated convolutionally coded portions of said 8VSB digital television signal;

at least one encoder for said outer convolutional coding;

trellis-initialization apparatus operable for forcing respective sets of consecutive trellis-reset symbols just before said signaling sequences, just before first training sequences, just before said second training sequences, just before said third training sequences, just before said fourth training sequences, and just before said fifth training sequences to have values that cause subsequent 12-phase 2/3 trellis coding by said encoder for said 12-phase 2/3 trellis coding to continue from standardized 2/3 trellis coding states for all said M/H Groups; and an improvement comprising:

said trellis-initialization apparatus further operable for forcing respective sets of twenty-four symbols close to the beginning of each one of said M/H Groups to have values that cause subsequent 12-phase 2/3 trellis coding by said encoder for said 12-phase 2/3 trellis coding to continue from standardized 2/3 trellis coding states common to all said M/H Groups.

2. The improved transmitter apparatus of claim 1, wherein said improvement further comprises:

said trellis-initialization apparatus further operable for forcing a respective set of twenty-four symbols close to the conclusion of each one of said M/H Groups to have values causing the subsequent 12-phase 2/3 trellis coding thereof by said encoder for said 12-phase 2/3 trellis coding to conclude with said standardized code states.

3. The improved transmitter apparatus of claim 2, wherein each of the transport packets encapsulating outer convolutional coding in said M/H Groups has one less byte in its header than in each main-service transport packet and so has an additional byte in its payload.

4. The improved transmitter apparatus of claim 2, wherein at least one said encoder for said outer convolutional coding begins coding from known states shortly after each said respective set of symbols close to the beginning of each one of said M/H Groups and concludes that coding with proper termination close to the conclusion of said one of said M/H Groups most recently begun.

5. The improved transmitter apparatus of claim 2, wherein at least one said encoder for said outer convolutional coding begins coding from known states immediately after said respective first training sequence within each of selected ones said M/H Groups and after a wrap-around of that coding concludes that coding with proper termination in the respective set of consecutive trellis-reset symbols just before said signaling sequence within said selected one of said M/H Groups most recently begun.

6. The improved transmitter apparatus of claim 2, wherein said improvement further comprises said trellis-initialization apparatus further operable for forcing a respective further set of forty-eight symbols within selected ones of said M/H Groups to have values causing the subsequent 12-phase 2/3 trellis coding thereof by said encoder for said 12-phase 2/3 trellis coding to conclude with said standardized code states; wherein at least one said encoder for said outer convolutional coding begins coding of a portion of a primary RS Frame from known states immediately after said respective first training sequence within each of selected ones said M/H Groups and concludes that coding with proper termination in said respective further set of forty-eight symbols within said selected one of said M/H Groups most recently begun; and wherein at least one said encoder for said outer convolutional coding begins coding of a portion of a secondary RS Frame coding from known states within each of said selected ones said M/H Groups immediately after the coding of the portion of the primary RS Frame concludes and, after a wrap-around of that coding of said portion of said secondary RS Frame, concludes that coding of said portion of said secondary RS Frame with proper termination in the respective set of consecutive trellis-reset symbols just before said signaling sequence within said selected one of said M/H Groups most recently begun.

7. A receiver for 8VSB signals employing 12-phase 2/3 trellis coding that functions as inner convolutional coding for concatenated convolutional coded portions of said 8VSB signal, successive concatenated convolutional coded portions of said 8VSB signal having outer convolutional coding and being arranged in M/H Groups, successive ones of said M/H Groups being spaced apart from each other by strings of bytes without said outer convolutional coding, each of said M/H Groups respectively including a respective signaling sequence of 8VSB symbols and respective first through fifth training sequences of 8VSB symbols of prescribed values thereafter, each of said signaling sequences and each of said training sequences immediately preceded by a respective trellis-initialization of the inner convolutional coding of said concatenated convolutional coded portions of said 8VSB signal therein, each of said successive ones of said M/H Groups having close to its beginning a respective initial trellis-initialization of the inner convolutional coding of said concatenated convolutional coded portions of said 8VSB signal therein, each of said successive ones of said M/H Groups having close to its conclusion a respective final trellis-initialization of the inner convolutional coding of said concatenated convolutional coded portions of said 8VSB signal therein, said receiver comprising:

apparatus for recovering successive digitized samples of said 8VSB signal on a symbol-by-symbol basis to supply successive soft digital 8VSB symbols at baseband;

a decoder memory operable for temporarily storing ones of said successive soft 8VSB symbols from a most currently selected one of said M/H Groups;

turbo decoding apparatus connected for alternately decoding the inner convolutional coding and the outer convolutional coding of the soft 8VSB symbols temporarily stored in said decoder memory and updating soft data bits of said successive soft 8VSB symbols responsive to turbo decoding results, each of the decoding procedures for the inner convolutional coding performed by said turbo decoding apparatus beginning from known code states within said most currently selected one of said M/H Groups; and a frame memory operable for temporarily storing a frame of said turbo decoding results from several ones of said M/H Groups.

8. The receiver of claim 7 wherein at least some of the decoding procedures for the inner convolutional coding performed by said turbo decoding apparatus proceed in a direction corresponding to normal time order, beginning from known code states close to the beginning of a currently selected one of said M/H Groups.

9. The receiver of claim 7 wherein at least some of the decoding procedures for the inner convolutional coding performed by said turbo decoding apparatus proceed in a direction counter to normal time order, beginning from known code states close to the conclusion of a currently selected one of said M/H Groups as considered in the time order of its transmission.

10. The receiver of claim 7 adapted for usefully receiving concatenated convolutional coded portions of said 8VSB signal in particular ones of said M/H Groups, each of which particular ones of said M/H Groups conveys a concatenated convolutional coded portion of a primary RS Frame of randomized first data beginning immediately after said first training sequence in that particular one of said M/H Groups and then wrapping around that particular one of said M/H Groups to conclude with said trellis-initialization preceding said signaling sequence therein, the receiver of claim 7 being so adapted by arranging for said decoder memory to temporarily store ones of said successive soft 8VSB symbols from a most currently selected one of said M/H Groups for reading and updating in normal time order despite said successive soft 8VSB symbols being received out of normal time order during their initial writing to said decoder memory.

11. The receiver of claim 7 adapted for usefully receiving concatenated convolutional coded portions of said 8VSB signal in particular ones of said M/H Groups, each of which particular ones of said M/H Groups conveys a concatenated convolutional coded portion of a primary RS Frame of randomized first data beginning immediately after said first training sequence in that particular one of said M/H Groups and concluding with a respective concluding trellis-initialization which properly terminates the inner convolutional coding of said portion of a primary RS Frame, each of which particular ones of said M/H Groups conveys a concatenated convolutional coded portion of a secondary RS Frame of randomized second data beginning immediately after said respective concluding trellis-initialization and then wrapping around that particular one of said M/H Groups to conclude with said trellis-initialization preceding said signal sequence therein, the receiver of claim 7 being so adapted by arranging for said decoder memory to temporarily store ones of said successive soft 8VSB symbols from a most currently selected one of said M/H Groups for reading and updating in normal time order despite said successive soft 8VSB symbols being received out of normal time order during their initial writing to said decoder memory.

12. A receiver for 8VSB signals employing 12-phase 2/3 trellis coding that functions as inner convolutional coding for concatenated convolutional coded portions of said 8VSB signal, successive concatenated convolutional coded portions of said 8VSB signal having outer convolutional coding and being arranged in M/H Groups, successive ones of said M/H Groups being spaced apart from each other by strings of bytes without said outer convolutional coding, each of said M/H Groups respectively including a respective signaling sequence of 8VSB symbols and respective first through fifth training sequences of 8VSB symbols of prescribed values thereafter, each of said signaling sequences and each of said training sequences immediately preceded by a respective trellis-initialization of the inner convolutional coding of said concatenated convolutional coded portions of said 8VSB signal therein, each of said successive ones of said M/H Groups having close to its beginning a respective trellis-initialization of the inner convolutional coding of said concatenated convolutional coded portions of said 8VSB signal therein, each of said successive ones of said M/H Groups having close to its conclusion a respective final trellis-initialization of the inner convolutional coding of said concatenated convolutional coded portions of said 8VSB signal therein, in at least a selected one of said successive M/H Groups an earlier portion of said concatenated convolutional coding beginning immediately after said respective first sequence of known training symbols in said selected one of said successive M/H Groups and wrapping around that said selected one of said successive M/H Groups to conclude with said trellis-initialization preceding said signal sequence therein, said receiver comprising:

apparatus for recovering successive digitized samples of said 8VSB signal on a symbol-by-symbol basis to supply successive soft digital 8VSB symbols at baseband;

a decoder memory operable for temporarily storing ones of said successive soft 8VSB symbols within an M/H Group, said first memory being initially written so as to restore said respective sequence of soft 8VSB symbols generated by inner convolutional coding of symbol-interleaved outer-convolutional-coded M/H data to normal time order during subsequent reading from said decoder memory and updating of said soft 8VSB symbols to support turbo decoding, whereby said earlier portion of said respective sequence of soft 8VSB symbols generated by inner convolutional coding of symbol-interleaved outer-convolutional-coded M/H data is read from said decoder memory to support turbo decoding before said later portion of said respective sequence of soft 8VSB symbols is read from said first memory to support turbo decoding;

a turbo decoder connected for decoding each said respective sequence of soft 8VSB symbols generated by inner convolutional coding of symbol-interleaved outer-convolutional-coded M/H data read thereto from said decoder memory, thereby to recover said M/H data possibly corrupted by errors; and error-correction apparatus connected for receiving said M/H data decoded from a plurality of M/H Groups and for correcting at least some kinds of possible errors therein.

* * * * *